(12) United States Patent
Han et al.

(10) Patent No.: US 10,545,555 B2
(45) Date of Patent: Jan. 28, 2020

(54) ELECTRONIC DEVICE FOR MANAGING POWER AND METHOD OF CONTROLLING SAME

(71) Applicant: Samsung Electronics Co., Ltd., Gyeonggi-do (KR)

(72) Inventors: Yun-Hui Han, Gyeonggi-do (KR); Min-Su Kim, Gyeonggi-do (KR); Chul-Woo Park, Gyeonggi-do (KR); Seung-Chul Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 453 days.

(21) Appl. No.: 15/261,033

(22) Filed: Sep. 9, 2016

(65) Prior Publication Data

US 2017/0070071 A1 Mar. 9, 2017

(30) Foreign Application Priority Data

Sep. 9, 2015 (KR) .......................... 10-2015-0127814

(51) Int. Cl.
*G06F 1/3206* (2019.01)
*H02J 7/00* (2006.01)
(Continued)

(52) U.S. Cl.
CPC ........... *G06F 1/3206* (2013.01); *G05B 15/02* (2013.01); *G06F 1/3203* (2013.01); *G06F 1/325* (2013.01);
(Continued)

(58) Field of Classification Search
None
See application file for complete search history.

(56) References Cited

U.S. PATENT DOCUMENTS

2004/0054937 A1 3/2004 Williams et al.
2012/0327749 A1* 12/2012 Tsukamoto .............. G06F 1/14
368/204

(Continued)

FOREIGN PATENT DOCUMENTS

| KR | 10-2007-0068927 | 7/2007 |
| KR | 10-2010-0065999 | 6/2010 |
| KR | 10-2013-0072447 | 7/2013 |

OTHER PUBLICATIONS

European Search Report dated Feb. 15, 2017 issued in counterpart application No. 16186846.8-1972, 10 pages.

*Primary Examiner* — Qing Yuan Wu
(74) *Attorney, Agent, or Firm* — The Farrell Law Firm, P.C.

(57) ABSTRACT

An electronic device is provided. The electronic device includes a battery, a power management integrated circuit (PMIC), that is electrically connected to the battery, adjusts at least part of power received from the battery, and outputs a controlled power, a processor electrically connected to the PMIC, at least one power sensor that is one of electrically connected between the battery and the PMIC and constitutes a part of the PMIC, and a control circuit electrically connected to the at least one power sensor. The control circuit acquires at least one of a current value and a power value input into the PMIC from the battery, determines whether at least one of the acquired current value and power value is greater than or equal to a threshold, and generates a first signal for controlling at least one of the PMIC and the processor, at least partially based on the determination.

10 Claims, 21 Drawing Sheets

(51) Int. Cl.
*G05B 15/02* (2006.01)
*G06F 1/3215* (2019.01)
*G06F 1/3234* (2019.01)
*G06F 1/3203* (2019.01)

(52) U.S. Cl.
CPC .......... *G06F 1/3215* (2013.01); *H02J 7/0065* (2013.01); *H02J 7/00* (2013.01); *H02J 2007/0067* (2013.01)

(56) References Cited

U.S. PATENT DOCUMENTS

| | | |
|---|---|---|
| 2013/0173946 A1 | 7/2013 | Rotem et al. |
| 2014/0223214 A1 | 8/2014 | Nabhane |
| 2015/0340898 A1* | 11/2015 | Schwartz ................ G06F 1/266 320/103 |
| 2016/0014700 A1* | 1/2016 | Taha ...................... G06F 1/3212 455/574 |

* cited by examiner

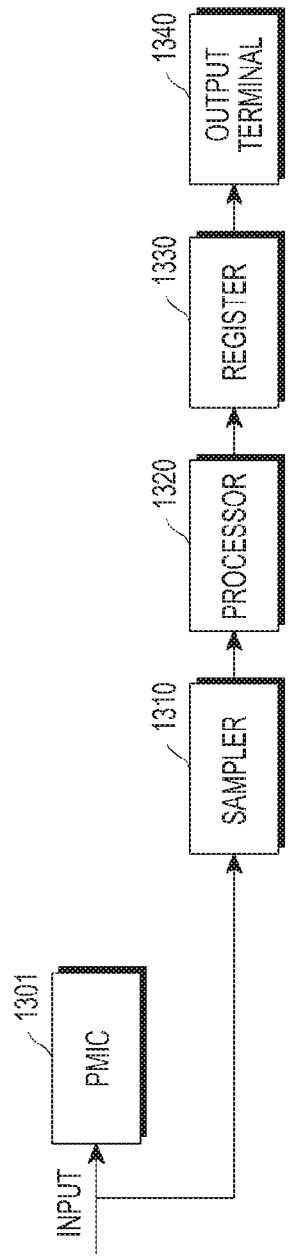
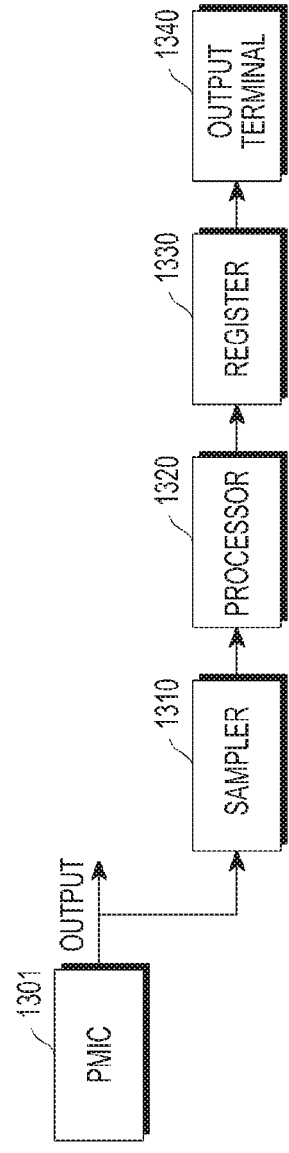

ELECTRONIC DEVICE FOR MANAGING POWER AND METHOD OF CONTROLLING SAME

PRIORITY

This application claims priority under 35 U.S.C. § 119(a) to Korean Patent Application Serial No. 10-2015-0127814, which was filed in the Korean Intellectual Property Office on Sep. 9, 2015, the entire content of which is incorporated herein by reference.

BACKGROUND

1. Field of the Disclosure

The present disclosure relates to an electronic device for managing power and a method of controlling the same, and more particularly, to an electronic device for controlling used power and a method of controlling the same.

2. Description of the Related Art

Portable electronic devices may be relatively small and may include a display and a communication module. Through the portable electronic device, a user can watch contents or access the Internet anywhere. As the portable electronic device is manufactured to be relatively small to increase portability it has a relatively small battery therein.

As the battery is relatively small, the portable electronic device may have a relatively short operation time. Accordingly, the user may have to purchase an additional accessary to frequently replace the battery or charge the battery of the portable electronic device, which can be inconvenient for the user. The conventional portable electronic device includes a power management integrated circuit (PMIC). The PMIC manages power output to each piece of hardware in the portable electronic device.

As described above, the conventional portable electronic device may include the PMIC and regulate power output to each piece of hardware. However, a power management method of limiting used power according to hardware use information or application use information is currently not known in the related arts. Accordingly, the conventional portable electronic device, which includes a relatively small battery, has a short operation life.

SUMMARY

The present disclosure has been made to address at least the disadvantages described above and to provide at least the advantages described below. Accordingly, as aspect of the present disclosure provides an electronic device for controlling used power based on at least one of a current value and a power value input into the PMIC, and a method of controlling the same. The present disclosure provides an electronic device for controlling used power based on a power value of at least one of an input terminal and an output terminal of the PMIC, and a method of controlling the same.

In accordance with an aspect of the present disclosure, an electronic device is provided. The electronic device includes a battery, a power management integrated circuit (PMIC), that is electrically connected to the battery, adjusts at least part of power received from the battery, and outputs a controlled power, a processor electrically connected to the PMIC, at least one power sensor that is one of electrically connected between the battery and the PMIC and constitutes a part of the PMIC, and a control circuit electrically connected to the at least one power sensor, wherein the control circuit acquires, from the power sensor, at least one of a current value and a power value input into the PMIC from the battery, determines whether at least one of the acquired current value and power value is greater than or equal to a threshold, and generates a first signal for controlling at least one of the PMIC and the processor, at least partially based on the determination.

In accordance with another aspect of the present disclosure, an electronic device is provided. The electronic device includes a battery, a power management integrated circuit (PMIC) that is electrically connected to the battery, adjusts at least part of power received from the battery, and outputs a controlled power, a power sensor that senses at least one of a power value of an input terminal of the PMIC and a power value of an output terminal of the PMIC, and a control circuit electrically connected to the power sensor, wherein the control circuit generates a first signal for controlling at least one hardware component of the electronic device and at least one of an application program executed by the electronic device based on the at least one of the power value of the input terminal of the PMIC and the power value of the output terminal of the PMIC provided from the power sensor.

In accordance with another aspect of the present disclosure, a method of operating an electronic device is provided. The method includes acquiring, from a power sensor, at least one of a current value and a power value input into a power management integrated circuit (PMIC) by the electronic device comprising the PMIC and the power sensor, determining whether at least one of the acquired current value and power value is greater than or equal to a threshold value by the electronic device, and generating a first signal for controlling at least one piece of hardware of the electronic device, at least partially based on the determination by the electronic device.

In accordance with another aspect of the present disclosure, a method of controlling an electronic device including a PMIC is provided. The method includes sensing at least one of a power value of an input terminal of the PMIC and a power value of an output terminal of the PMIC, and generating a first signal for controlling at least one of at least one hardware component of the electronic device and an application program executed by the electronic device based on the at least one of the power value of the input terminal of the PMIC and the power value of the output terminal of the PMIC provided from a power sensor.

In accordance with another aspect of the present disclosure, an electronic device is provided. The electronic device includes a battery, a power management integrated circuit (PMIC) that is electrically connected to the battery, adjusts at least part of power received from the battery, and outputs a controlled power, a processor electrically connected to the PMIC, at least one power sensor that is electrically connected between the battery and the PMIC, and a control circuit electrically connected to the at least one power sensor, wherein the control circuit acquires, from the at least one power sensor, at least one of a current value and a power value input into the PMIC from the battery, determines whether at least one of the acquired current value and power value is greater than or equal to a threshold, and generates a first signal for controlling at least one of the PMIC and the processor, at least partially based on the determination, and the at least one power sensor is electrically connected between the PMIC and the battery.

BRIEF DESCRIPTION OF THE DRAWINGS

The above and other aspects, features and advantages of certain exemplary embodiments of the present invention will be more apparent from the following detailed description taken in conjunction with the accompanying drawings, in which:

FIGS. 13A to 13C are block diagrams of a configuration of a power sensor, according to an embodiment of the present disclosure;

DETAILED DESCRIPTION

Figure 1:
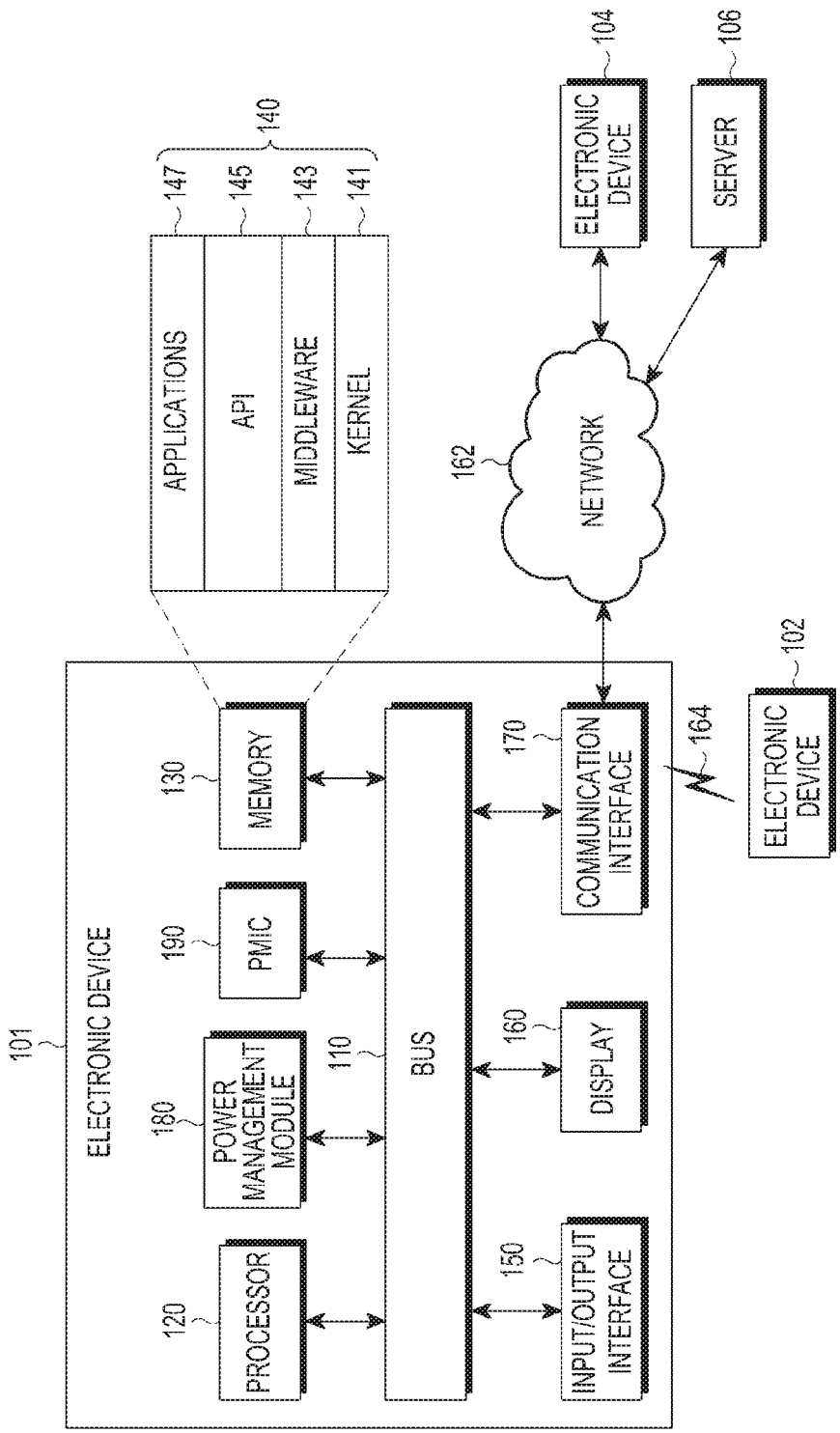
FIG. 1 is a diagram of an electronic device and a network, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present invention may include at least one of an Application-Specific Integrated Circuit (ASIC) chip, a Field-Programmable Gate Arrays (FPGA), and a programmable-logic device for performing operations which has been known or are to be developed hereinafter.

An electronic device according to the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of Things device (IoT) (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the present disclosure, the term "user" may indicate a person using an electronic device or a device (e.g., an artificial intelligence electronic device) using an electronic device.

An electronic device 101 within a network environment 100, according to an embodiment of the present disclosure, will be described with reference to FIG. 1. The electronic device 101 includes a bus 110, a processor 120, a memory 130, an input/output interface 150, a display 160, and a communication interface 170. The electronic device 101 may omit at least one of the elements, or may further include other elements.

The bus 110 may include, for example, a circuit which interconnects the components 110 to 170 and delivers communication (for example, a control message and/or data) between the components 110 to 170.

The processor 120 may include one or more of a central processing unit (CPU), an application processor (AP), and a communication processor (CP). For example, the processor 120 may carry out operations or data processing related to control and/or communication of at least one other component of the electronic device 101.

The memory 130 may include a volatile memory and/or a non-volatile memory. The memory 130 may store, for example, instructions or data relevant to at least one other element of the electronic device 101. The memory 130 may store software and/or a program 140. The program 140 may include a kernel 141, middleware 143, an application programming interface (API) 145, and/or application programs (or "applications") 147. At least some of the kernel 141, the middleware 143, and the API 145 may be referred to as an operating system (OS).

The kernel 141 may control or manage system resources (for example, the bus 110, the processor 120, or the memory 130) used for performing an operation or function implemented by the other programs (for example, the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143, for example, may function as an intermediary for allowing the API 145 or the application programs 147 to communicate with the kernel 141 to exchange data.

In addition, the middleware 143 may process one or more task requests received from the application programs 147 according to priorities thereof. For example, the middleware 143 may assign priorities for using the system resources (for example, the bus 110, the processor 120, the memory 130, or the like) of the electronic device 101, to at least one of the application programs 147. For example, the middleware 143 may perform scheduling or load balancing on the one or more task requests by processing the one or more task requests according to the priorities assigned thereto.

The API 145 is an interface through which the applications 147 control functions provided from the kernel 141 or the middleware 143, and may include, for example, at least one interface or function (instructions) for file control, window control, image processing, or text control.

The input/output interface 150 may function as, for example, an interface that transfers instructions or data input from a user or another external device to the other element(s) of the electronic device 101. Furthermore, the input/output interface 150 may output the instructions or data received from the other element(s) of the electronic device 101 to the user or another external device.

The display 160 may include, for example, a liquid crystal display (LCD), a light-emitting diode (LED) display, an organic light-emitting diode (OLED) display, a microelectromechanical systems (MEMS) display, and an electronic paper display. The display 160 may display various types of contents (such as, text, images, videos, icons, or symbols) for the user. The display 160 may include a touch screen and may receive, for example, a touch, gesture, proximity, or hovering input using an electronic pen or the user's body part.

The communication interface 170 may set communication between the electronic device 101 and a first external electronic device 102, a second external electronic device 104, or a server 106. For example, the communication interface 170 may be connected to a network 162 through wireless or wired communication to communicate with the second external electronic device 104 or the server 106.

The wireless communication may use at least one of, for example, long term evolution (LTE), LTE-advance (LTE-A), code division multiple access (CDMA), wideband CDMA (WCDMA), universal mobile telecommunications system (UMTS), wireless broadband (WiBro), and global system for mobile communications (GSM), as a cellular communication protocol. In addition, the wireless communication may include, for example, short range communication 164. The short-range communication 164 may be performed by using at least one of, for example, wireless-fidelity (Wi-Fi), Bluetooth, near field communication (NFC), and global navigation satellite system (GNSS). The GNSS may include at least one of, for example, a global positioning system (GPS), a global navigation satellite system (Glonass), a navigation satellite system (Beidou), and a European global satellite-based navigation system (Galileo), according to a use area, a bandwidth, or the like. In the present disclosure, the "GPS" may be interchangeably used with the "GNSS". The wired communication may include, for example, at least one of a universal serial bus (USB), a high definition multimedia Interface (HDMI), recommended standard 232 (RS-232), and a plain old telephone service (POTS). The network 162 may include at least one of a communication network such as a computer network (for example, a local area network (LAN) or a wireless area network (WAN)), the Internet, and a telephone network.

Each of the first and second external electronic devices 102 and 104 may be of a type identical to or different from that of the electronic device 101. The server 106 may include a group of one or more servers. All or some of the operations performed in the electronic device 101 may be performed in another electronic device or a plurality of electronic devices (for example, the electronic devices 102 and 104 or the server 106). When the electronic device 101 has to perform some functions or services automatically or in response to a request, the electronic device 101 may make a request for performing at least some functions relating thereto to the electronic device 102 or 104 or the server 106 instead of performing the functions or services by itself or in addition. The electronic device 102 or 104 or the server 106 may execute the requested functions or the additional functions, and may deliver a result of the execution to the electronic device 101. The electronic device 101 may provide the received result as it is or additionally process the received result and provide the requested functions or services. To achieve this, for example, cloud computing, distributed computing, or client-server computing technology may be used.

A PMIC 190 may manage power transferred to hardware of the electronic device 101. The PMIC 190 may adjust the size of the power transferred to each piece of hardware from a battery of the electronic device 101.

The PMIC 190 may be electrically connected to the battery, and may control at least some of the power received from the battery and output the controlled power. The processor 120 may be electrically connected to the PMIC 190. Meanwhile, the electronic device 101 may be electrically connected between the battery and the PMIC 190 or may include at least one power sensor included in some of the PMIC.

A power management module 180 may include a control circuit electrically connected to the power sensor. In this case, the control circuit may acquire, from the power sensor, at least one of a current value and a power value input into the PMIC 190 the battery, determine whether at least one of the acquired current value and power value is greater than or equal to a threshold value, and generate a first signal for controlling at least one of the PMIC 190 and the processor 120, at least partially based on the determination.

The PMIC 190 may include one or more regulators for controlling at least some of the power received from the battery.

At least one power sensor may be electrically connected between the battery and one of the one or more regulators.

The PMIC 190 may include a first circuit including a first power sensor connected to the battery and a first regulator connected to the first power sensor in series and a second circuit including a second power sensor connected to the battery and a second regulator connected to the second power sensor in series, and the first circuit and the second circuit may be connected between the battery and the processor in parallel.

The control circuit may be electrically connected between the battery and the at least one power sensor.

The control circuit and the processor 120 may be arranged within the same chip, e.g., a system on chip (SoC).

At least a part of the control circuit may be arranged within a chip including the PMIC 190.

The control circuit may electrically connected between the PMIC 190 and hardware corresponding to the PMIC 190.

The first signal may include at least one piece of information for controlling at least some functions of the processor 120, information for controlling at least some functions of an application program executed by the processor 120, and information for controlling an amount of power supplied to the processor 120 from the PMIC 190.

The electronic device 101 may further include at least one sub PMIC that adjusts at least part of power received from the battery and supplies the controlled power to each of at least one piece of hardware included in the electronic device, and a sub power sensor electrically connected between the battery and each PMIC.

The electronic device 101 may further include a temperature sensor that measures a temperature of the processor 120, and the control circuit may generate the first signal at least partially based on the measured temperature.

The PMIC 190 may control at least some of the power received from the battery and output the controlled power.

The electronic device 101 may include a power sensor that senses a power value of at least one of an input terminal and an output terminal of the PMIC 190. The power management module 180 may include a control circuit electrically connected to the power sensor, and the control circuit may generate a first signal for controlling at least one hardware component of the electronic device 101 and at least one of an application program executed by the electronic device 101 based on a power value provided from the power sensor.

The power sensor may sense at least one of a voltage value and a current value of at least one of an input terminal and an output terminal of the PMIC 190 and determine at least one power value of the input terminal and the output terminal of the PMIC 190 based on at least one of the sensed voltage value and current value.

The power sensor may include a first register that stores the sensed voltage value, a second register that stores the sensed current value, and a third register that stores the determined power value.

The power sensor may include a sampler that is connected to at least one of the input terminal and the output terminal of the PMIC 190 and samples the received signal, and a processor that performs a calculation on the received signal and determines the power value.

The memory 130 may store at least one threshold power value set as a reference for controlling at least one of the at least one piece of hardware and the application program executed by the electronic device 101.

The control circuit may compare the power value of at least one of the input terminal and the output terminal of the PMIC 190 input from the power sensor with the threshold power value and generate the first signal according to a result of the comparison.

The first signal may include information for controlling operations of at least some of the hardware components at least partially based on a power value consumed by the used hardware component among the at least one hardware component.

The first signal may include an instruction for controlling execution of a used application program at least partially based on a power value consumed by the used application program.

The power sensor may include a sub power sensor that senses a power value of at least one of an input terminal and an output terminal of each of the at least one piece of hardware.

When at least some of the power values of the input terminal and the output terminal of each of the at least one piece of hardware exceed a threshold power value, the control circuit may generate the first signal for limiting at least some operations of hardware corresponding to the power value that exceeds the threshold power value.

The electronic device 101 may further include a temperature sensor that measures a temperature of at least some of the at least one piece of hardware, and the control circuit may generate the first signal based on the measured temperature.

The control circuit may correspond to the PMIC 190, the at least one piece of hardware, and independent hardware component spaced apart from the battery.

The power sensor and the control circuit may be included in a single integrated circuit.

The processor 120 may include the control circuit.

At least a part of the control circuit may be arranged within the PMIC 190.

The PMIC 190 may be electrically connected to the battery, and may control at least some of the power received from the battery and output the controlled power, and the processor 120 may be electrically connected to the PMIC 190. The power sensor may be electrically connected between the battery and the PMIC 190, and the power management module 180 may include a control circuit electrically connected to the power sensor. The control circuit may acquire, from the power sensor, at least one of a current value and a power value input into the PMIC 190 from the battery, determine whether at least one of the acquired current value and power value is greater than or equal to a threshold value, and generate a first signal for controlling at least one of the PMIC 190 and the processor 120 at least partially based on the determination, and the power sensor may be electrically connected between the PMIC 190 and the battery.

Figure 2:
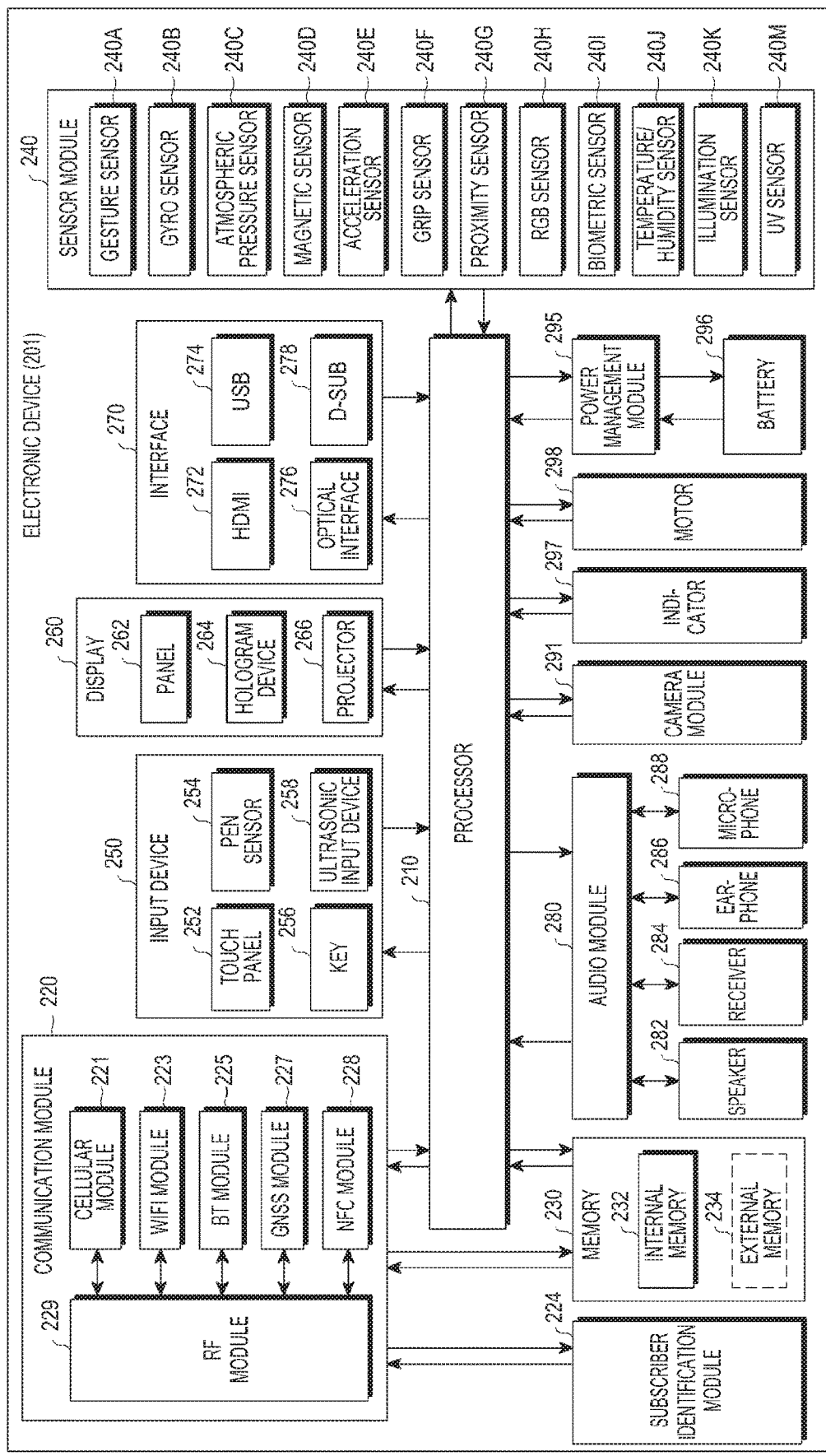
FIG. 2 is a diagram of an electronic device, according to an embodiment of the present disclosure.

FIG. 2 is a diagram of an electronic device 201, according to an embodiment of the present disclosure. The electronic device 201 may include, for example, the whole or part of the electronic device 101 illustrated in FIG. 1. The electronic device 201 may include at least one processor 210 (for example, an Application Processor (AP)), a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may drive, for example, an operating system or application programs to control a plurality of hardware or software elements connected thereto and to perform various types of data processing and operations. The processor 210 may be implemented by, for example, an SoC. The processor 210 may further include a graphic processing unit (GPU) and/or an image signal processor. The processor 210 may also include at least some (for example, a cellular module 221) of the elements illustrated in FIG. 2. The processor 210 may load, into a volatile memory, instructions or data received from at least one (for example, a non-volatile memory) of the other elements and may process the loaded instructions or data, and may store various data in a non-volatile memory.

The communication module 220 may have a configuration equal or similar to that of the communication module 170 of FIG. 1. The communication module 220 may include, for example, a cellular module 221, a Wi-Fi module 223, a Bluetooth module 225, a GNSS module 227 (for example, a GPS module, a Glonass module, a Beidou module, or a Galileo module), an NFC module 228, and a Radio Frequency (RF) module 229.

The cellular module 221 may provide a voice call, an image call, a text message service, or an Internet service through, for example, a communication network. The cellular module 221 may identify and authenticate the electronic device 201 within a communication network using the SIM card 224. The cellular module 221 may perform at least some of the functions that the processor 210 may provide. The cellular module 221 may include a Communication Processor (CP).

For example, each of the Wi-Fi module 223, the BT module 225, the GNSS module 227, and the NFC module 228 may include a processor for processing data transmitted/received through the corresponding module. At least some (two or more) of the cellular module 221, the Wi-Fi module 223, the BT module 225, the GNSS module 227, and the NFC module 228 may be included in one Integrated Chip (IC) or IC package.

The RF module 229 may transmit/receive, for example, a communication signal (for example, an RF signal). The RF module 229 may include, for example, a transceiver, a power amp module (PAM), a frequency filter, a low noise amplifier (LNA), or an antenna. At least one of the cellular module 221, the Wi-Fi module 223, the BT module 225, the GNSS module 227, and the NFC module 228 may transmit/receive an RF signal through a separate RF module.

The SIM 224 may be an embedded SIM, and may contain unique identification information (for example, an integrated circuit card identifier (ICCID)) or subscriber information (for example, an international mobile subscriber identity (IMSI)).

The memory 230 (may include, for example, an internal memory 232 or an external memory 234. The internal memory 232 may include at least one of, for example, a volatile memory (for example, a dynamic random access memory (DRAM), a static RAM (SRAM), a synchronous Dynamic RAM (SDRAM), and the like) and a non-volatile memory (for example, a one time programmable read only memory (OTPROM), a programmable ROM (PROM), an erasable and programmable ROM (EPROM), an electrically erasable and programmable ROM (EEPROM), a mask ROM, a flash ROM, a flash memory (for example, a NAND flash memory or a NOR flash memory), a hard driver, or a solid state drive (SSD).

The external memory 234 may further include a flash drive, for example, a compact flash (CF), a secure digital (SD), a micro secure digital (Micro-SD), a mini secure digital (Mini-SD), an eXtreme digital (xD), a multi-media card (MMC), a memory stick, or the like. The external memory 234 may be functionally and/or physically connected to the electronic device 201 through various interfaces.

The sensor module 240 may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, a light sensor 240K, and a ultraviolet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments, an electronic device 201 may further include a processor configured to control the sensor module 240 as a part of or separately from the processor 210, and may control the sensor module 240 while the processor 210 is in a sleep state.

The input device 250 may include, for example, a touch panel 252, a (digital) pen sensor 254, a key 256, and an ultrasonic input unit 258. The touch panel 252 may use at least one of, for example, a capacitive scheme, a resistive scheme, an infrared scheme, and an ultrasonic scheme. Further, the touch panel 252 may further include a control circuit. The touch panel 252 may further include a tactile layer and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect ultrasonic waves generated by an input tool through a microphone 288 and identify data corresponding to the detected ultrasonic waves.

The display 260 (may include a panel 262, a hologram device 264, or a projector 266. The panel 262 may include a configuration identical or similar to that of the display 160 illustrated in FIG. 1. The panel 262 may be implemented to be, for example, flexible, transparent, or wearable. The panel 262 and the touch panel 252 may be implemented as one module. The hologram device 264 may show a three dimensional (3D) image in the air by using interference of light. The projector 266 may display an image by projecting light onto a screen. The screen may be located, for example, in the interior of or on the exterior of the electronic device 201. The display 260 may further include a control circuit for controlling the panel 262, the hologram device 264, or the projector 266.

The interface 270 may include, for example, an HDMI 272, a USB 274, an optical interface 276, or a d-subminiature (D-sub) 278. The interface 270 may be included in, for example, the communication interface 170 illustrated in FIG. 1. Additionally or alternatively, the interface 270 may include, for example, a mobile high-definition Link (MHL) interface, an (SD card/multi-media card (MMC) interface, or an infrared data association (IrDA) standard interface.

The audio module 280 may bilaterally convert, for example, a sound and an electrical signal. At least some elements of the audio module 280 may be included in, for example, the input/output interface 150 illustrated in FIG. 1. The audio module 280 may process sound information which is input or output through, for example, a speaker 282, a receiver 284, earphones 286, the microphone 288 or the like.

The camera module 291 is a device which may photograph a still image and a dynamic image. The camera module 291 may include one or more image sensors (for example, a front sensor or a back sensor), a lens, an image signal processor (ISP) or a flash (for example, LED or xenon lamp).

The power management module 295 may manage, for example, power of the electronic device 201. The power management module 295 may include a PMIC, a charger integrated circuit (IC), or a battery gauge. The PMIC may have a wired and/or wireless charging scheme. Examples of the wireless charging method may include, for example, a magnetic resonance method, a magnetic induction method, an electromagnetic method, and the like. Additional circuits (for example, a coil loop, a resonance circuit, a rectifier, etc.) for wireless charging may be further included. The battery gauge may measure, for example, a residual quantity of the battery 296, and a voltage, a current, or a temperature during charging. The battery 296 may include, for example, a rechargeable battery or a solar battery.

The indicator 297 may display a particular state, for example, a booting state, a message state, a charging state, or the like of the electronic device 201 or a part (for example, the processor 210) of the electronic device 201. The motor 298 may convert an electrical signal into mechanical vibration, and may generate vibration, a haptic effect, or the like. Although not illustrated, the electronic device 201 may include a processing unit (for example, a GPU) for supporting mobile television (TV). The processing unit for supporting the mobile TV may, for example, process media data according to a certain standard such as digital multimedia broadcasting (DMB), digital video broadcasting (DVB), or MediaFlo™.

Each of the above-described component elements of hardware may be configured with one or more components, and the names of the corresponding component elements may vary based on the type of electronic device. The electronic device may include at least one of the aforementioned elements. Some elements may be omitted or other additional elements may be further included in the electronic device. Also, some of the hardware components may be combined into one entity, which may perform functions identical to those of the relevant components before the combination.

Figure 3:
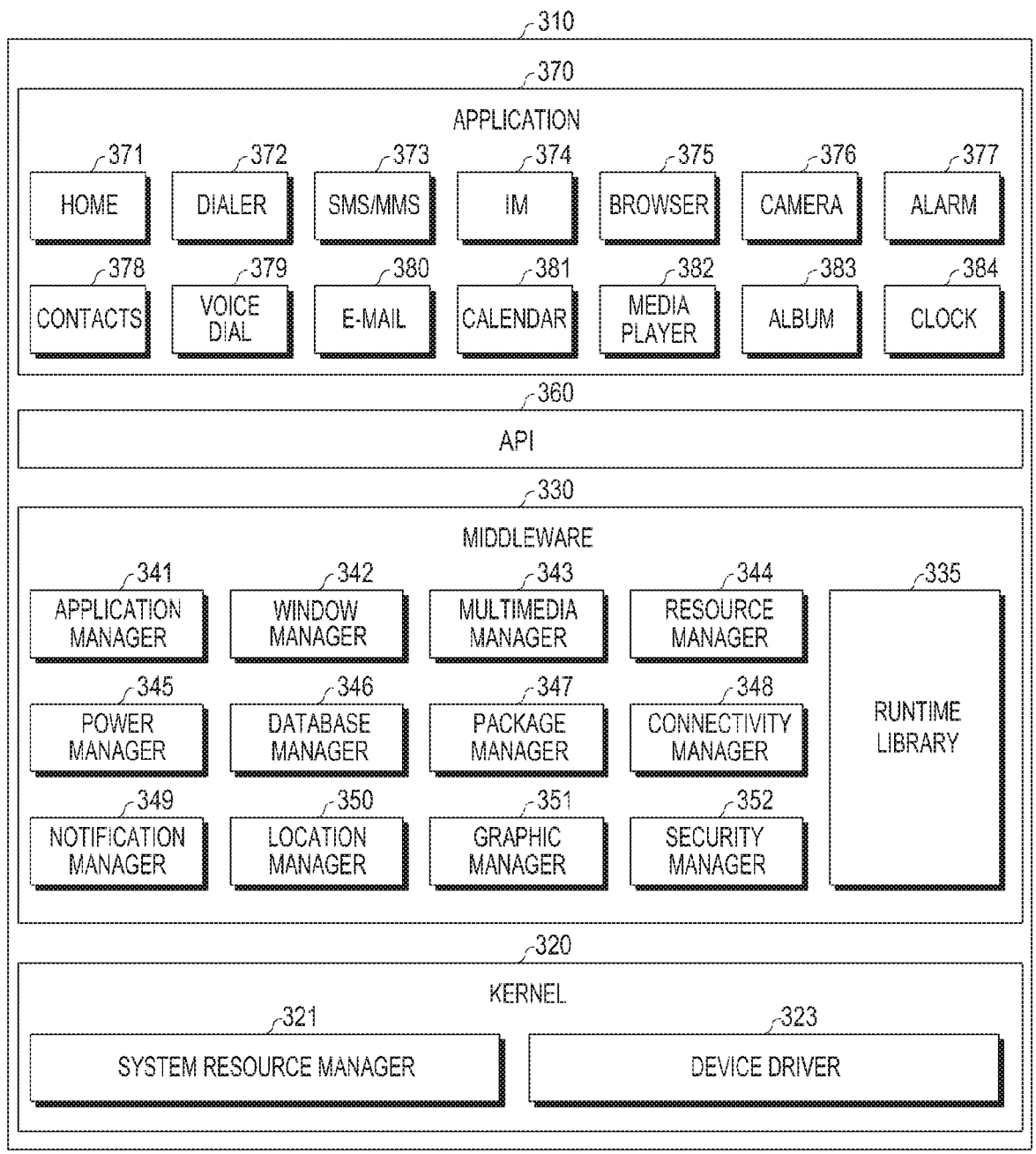
FIG. 3 is a diagram of a program module, according to an embodiment of the present disclosure.

FIG. 3 is a diagram of a program module, according to an embodiment of the present disclosure. The program module 310 may include an OS for controlling resources related to the electronic device (for example, the electronic device 101) and/or various applications (for example, the application programs 147) executed in the operating system. The operating system may be, for example, Android™, iOS™, Windows™, Symbian™, Tizen™, Bada™, or the like.

The program module 310 may include a kernel 320, middleware 330, an API 360, and/or applications 370. At least a part of the program module 310 may be preloaded on the electronic device, or may be downloaded from the electronic device 102 or 104, or the server 106.

The kernel 320 may include, for example, a system resource manager 321 and/or a device driver 323. The system resource manager 321 may control, assign, or collect system resources. The system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330 may provide a function required by the applications 370 in common or provide various functions to the applications 370 through the API 360 so that the applications 370 can efficiently use limited system resources within the electronic device. According to an embodiment, the middleware 330 may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while the applications 370 are being executed. The runtime library 335 may perform input/output management, memory management, or a function for an arithmetic function.

The application manager 341 may, for example, manage a life cycle of at least one of the applications 370. The window manager 342 may manage graphical user interface (GUI) resources used on a screen. The multimedia manager 343 may determine a format required to reproduce various media files, and may encode or decode a media file by using a coder/decoder (codec) appropriate for the corresponding format. The resource manager 344 may manage resources of at least one of the applications 370, such as a source code, a memory, and a storage space.

The power manager 345 may operate together with, for example, a basic input/output system (BIOS) to manage a battery or power and may provide power information required for the operation of the electronic device. The database manager 346 may generate, search for, and/or change a database to be used by at least one of the applications 370. The package manager 347 may manage the installation or update of an application distributed in the form of a package file.

The connectivity manager 348 may manage a wireless connection such as, for example, Wi-Fi or Bluetooth. The notification manager 349 may display or notify of an event, such as an arrival message, an appointment, proximity notification, and the like, in such a manner of not disturbing a user. The location manager 350 may manage location information of the electronic device. The graphic manager 351 may manage a graphic effect to be provided to a user and a user interface relating to the graphic effect. The security manager 352 may provide all security functions required for system security or user authentication. When the electronic device has a telephone call function, the middleware 330 may further include a telephony manager for managing a voice call function or a video call function of the electronic device.

The middleware 330 may include a middleware module that forms a combination of various functions of the above-described components. The middleware 330 may provide modules specialized according to types of operating systems in order to provide differentiated functions. Furthermore, the middleware 330 may dynamically remove some of the existing elements, or may add new elements.

The API 360 is, for example, a set of API programming functions, and may be provided with a different configuration according to an OS. For example, in the case of Android™ or iOS™, one API set may be provided for each platform, and in the case of Tizen™, two or more API sets may be provided for each platform.

The applications 370 may include, for example, one or more applications that can perform functions, such as home 371, dialer 372, SMS/MMS 373, instant message (IM) 374, browser 375, camera 376, alarm 377, contacts 378, voice dial 379, e-mail 380, calendar 381, media player 382, album 383, clock 384, health care (for example, measure exercise quantity or blood sugar level), or environment information (for example, atmospheric pressure, humidity, temperature information or the like).

The applications 370 may include an information exchange application supporting information exchange between the electronic device 101 and the electronic device 102 or 104. The information exchange application may include, for example, a notification relay application for transferring specific information to an external electronic device or a device management application for managing an external electronic device.

For example, the notification relay application may include a function of transferring, to the electronic device 102 or 104, notification information generated from other applications of the electronic device 101 (for example, an SMS/MMS application, an e-mail application, a health management application, or an environmental information application). Further, the notification relay application may receive notification information from, for example, an external electronic device and provide the received notification information to a user.

The device management application may manage (for example, install, delete, or update), for example, at least one function of the electronic device 102 or 104 communicating with the electronic device (for example, a function of turning on/off the external electronic device itself (or some components) or a function of adjusting luminance (or resolution) of the display), applications operating in the external electronic device, or services provided by the external electronic device (for example, a call service and a message service).

The applications 370 may include attributes of applications (for example, a health care application of a mobile medical appliance or the like) designated according to attributes of the electronic device 102 or 104. The applications 370 may include an application received from the server 106, or the electronic device 102 or 104. The applications 370 may include a preloaded application or a third party application which can be downloaded from the server. Names of the elements of the program module 310, according to the above-described embodiments of the present invention, may change depending on the type of OS.

At least some of the program module 310 may be implemented in software, firmware, hardware, or a combination of two or more thereof. At least some of the program module 310 may be implemented (for example, executed) by, for example, the processor 210. At least some of the program module 310 may include, for example, a module, a program, a routine, a set of instructions, and/or a process for performing one or more functions.

At least some of the devices (for example, modules or functions thereof) or the method (for example, operations) may be implemented by a command stored in a non-transitory computer-readable storage medium in a programming module form. The instruction, when executed by the processor 120, may cause the one or more processors to execute the function corresponding to the instruction. The non-transitory computer-readable storage medium may be, for example, the memory 130.

The computer readable recording medium may include a hard disk, a floppy disk, magnetic media (e.g., a magnetic tape), optical media (e.g., a compact disc ROM (CD-ROM) and a digital versatile disc (DVD)), magneto-optical media (e.g., a floptical disk), a hardware device (e.g., a ROM, a RAM, a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present invention, and vice versa.

The programming module may include one or more of the aforementioned components or may further include other additional components, or some of the aforementioned components may be omitted. Operations executed by a module, a programming module, or other component elements may be executed sequentially, in parallel, repeatedly, or in a heuristic manner. Further, some operations may be executed according to another order or may be omitted, or other operations may be added. The embodiments disclosed herein are provided to help the understanding of the present disclosure, and are not intended to limit the scope of the present disclosure. Accordingly, the scope of the present disclosure should be construed as including all modifications or various other embodiments based on the technical idea of the present disclosure.

Figure 4:
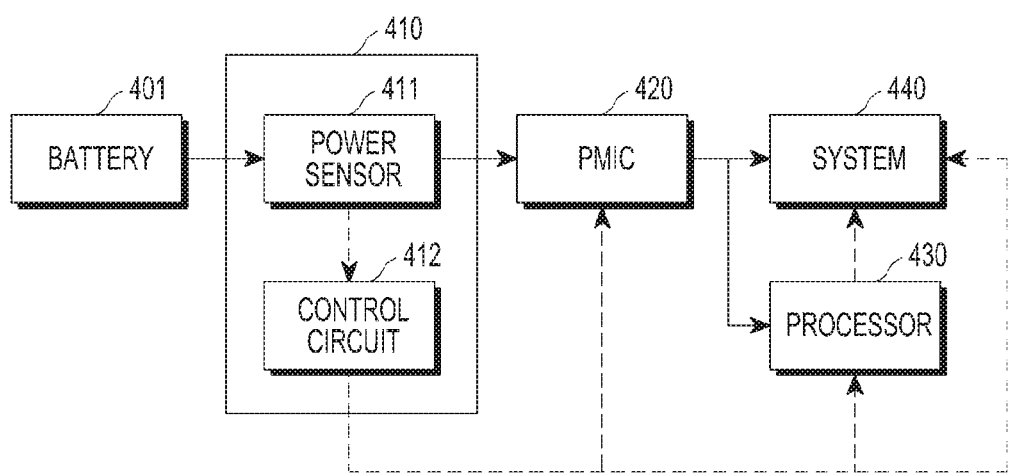
FIG. 4 is block diagram of an electronic device, according to an embodiment of the present disclosure.

FIG. 4 is a diagram of an electronic device, according to an embodiment of the present disclosure.

The electronic device may include a battery 401, a power management module 410, a PMIC 420, a processor 430, and a system 440.

The battery 401 may include a rechargeable battery and/or a solar battery. The battery 401 can provide power to each piece of hardware of the electronic device. The battery 401 is attachable/detachable to/from the electronic device, but it is only an example. The battery 401 that may be connected to the electronic device may provide power to each piece of hardware of the electronic device. In the embodiment of FIG. 4, a path for power is displayed by the solid line and a path through which a signal or information is provided is displayed by the dotted line. The battery 401 may provide power to the PMIC 420 through the power management module 410.

The PMIC 420 may manage power input from the battery 401 and output the power to each piece of hardware of the electronic device, for example, the system 440. For example, the PMIC 420 may provide the power input from the battery 401 to some hardware of the system 440. For example, if only some pieces of the system 440 are operating, and the PMIC 420 may provide power from the battery 401 only to those pieces of hardware requested to operate but not provide the power to the remaining pieces of hardware which are not requested to operate. Further, the PMIC 420 may regulate power and provide the regulated power to the hardware, that is, the processor 430 or the system 440. A detailed configuration of the PMIC 420 will be described below in more detail. Meanwhile, although the power sensor 411 is included in the power management module 410 in the embodiment of FIG. 4, the power sensor 411 may be a part of the PMIC 420.

The processor 430 may include one or more of a central processing unit (CPU), an AP, and a communication processor (CP). The processor 430 may control, for example, at least one other element of the electronic device and/or execute operations or data processing related to communication. The processor 430 may control the PMIC 420 and the system 440. The processor 430 may determine hardware to which the PMIC 420 transfers power. For example, the processor 430 may determine used hardware based on hardware use information of a driven application and may control the PMIC 420 to transfer power to the used hardware and to not transfer power to hardware which is not used.

Meanwhile, the processor 430 may receive a first signal generated from the power management module 410. The first signal may include at least one piece of information for controlling at least some functions of the processor 430, information for controlling at least some functions of an application executed by the processor 430, and information for controlling an amount of power supplied to the processor 430 from the PMIC 420. The processor 430 may control the PMIC 420 by using the received first signal or limit at least some functions of the application or at least some functions of the processor 430 by using the first signal. Further, the processor 430 may adjust a power value transferred to the system 440, particularly, each piece of hardware from the PMIC 420.

The power sensor 411 may sense at least one of a current value and a power value input into the PMIC 420. For example, the power sensor 411 may be arranged on a path of the power input from the battery 401 and output to the PMIC 420. The power sensor 411 may include at least one means (or device) which may measure a current value input into the PMIC 420. Alternatively, the power sensor 411 may further include at least one means which may measure a voltage value input into the PMIC 420. The power sensor 411 may operate the measured current value and the measured voltage value and acquire a power value input into the PMIC 420. The power sensor 411 may sample a signal input from the battery 401 and sense at least one of the power value and the current value. Further, the power sensor 411 may further include a register which may store each of the power value and the voltage value for the operation and a register which may store a power value corresponding to a result of the operation. A more detailed configuration of the power sensor 411 will be described below. Meanwhile, the PMIC 420 may include a regulator for controlling at least some of the power received from the battery. In this case, the power sensor 411 may be electrically connected to the regulator.

The control circuit 412 may acquire, from the power sensor 411, at least one of the current value and the power value input into the PMIC 420 from the battery 401. The control circuit 412 may determine whether at least one of the detected current value and power value is greater than or equal to a threshold value. The control circuit 412 may generate a first signal for controlling at least one of the PMIC and the processor at least partially based on the determination. The first signal may include at least one piece of information for controlling at least some functions of the processor, information for controlling at least some functions of an application executed by the processor, and information for controlling an amount of power supplied to the processor from the PMIC.

Meanwhile, the PMIC 420 may include at least one sub PMIC configured to control at least some of the power received from the battery and to supply the controlled power to each of at least one piece of hardware included in the electronic device, which will be described below in more detail. In this case, the power sensor 411 may include a sub power sensor electrically connected between the battery and the sub PMIC.

Meanwhile, the control circuit 412 may generate a first signal for controlling at least one of the at least one piece of hardware of the electronic device and an application executed by the electronic device based on at least one power value of an input terminal or an output terminal of the PMIC, which is input from the power sensor 411. That is, the power sensor 411 may sense at least one voltage value of the input terminal or the output terminal of the PMIC, sense at least one current value of the input terminal or the output terminal of the PMIC, operate the sensed voltage value and the sensed current value, and sense at least one power value of the input terminal or the output terminal of the PMIC. The power management module 410 may store at least one threshold power value set as a reference for controlling at least one piece of hardware and the application executed by the electronic device.

The control circuit 412 may compare at least one power value of the input terminal or the output terminal of the PMIC, which is input from the power sensor, with the threshold power value and generate the first signal according to a result of the comparison.

The control circuit 412 may calculate a sum of the power values consumed by the used hardware among at least one piece of hardware and, when the sum of the power values is greater than or equal to a first threshold power value, generate the first signal for limiting at least some operations of the used hardware.

The control circuit 412 may calculate a sum of the power values consumed by the executed application and, when the sum of the power values is greater than or equal to a second threshold power value, generate the first signal for limiting at least some operations of the executed application.

When at least some of the power values in at least one of the input terminal or the output terminal of each of at least one piece of hardware are greater than or equal to a third threshold power value, the control circuit may generate the first signal for limiting at least some operations of the hardware corresponding to the power value which is greater than or equal to the third threshold power value.

Figure 5:
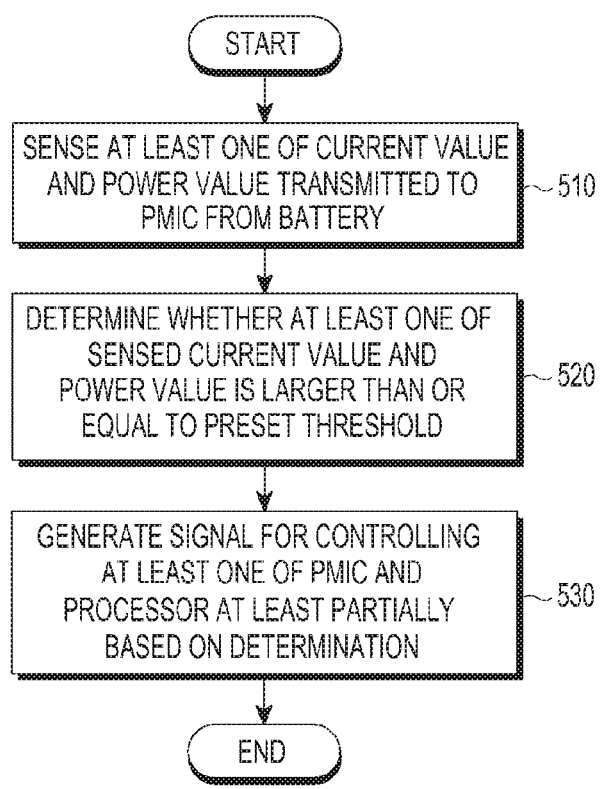
FIG. 5 is flowchart of a method of controlling the electronic device, according to an embodiment of the present disclosure.

FIG. 5 is flowchart illustrating a method of controlling the electronic device, according to an embodiment of the present disclosure.

In step 510, the electronic device may sense at least one of a current value and a power value transmitted to the PMIC from the battery. The electronic device may acquire, from the PMIC, at least one of the current value or the power value transmitted to the PMIC from the battery. The electronic device may acquire at least one of the current value and the power value transmitted to the PMIC from the battery, from a power sensor spaced apart from the PMIC. In this case, the power sensor may be arranged on a path of the power connected from battery to the PMIC.

In step 520, the electronic device may determine whether at least one of the sensed current value or power value is greater than or equal to a preset threshold value. An operation for determining whether at least one of the sensed current value or power value is greater than or equal to the preset threshold value may be performed by the PMIC. Alternatively, the operation for determining whether at least one of the sensed current value or power value is greater than or equal to the preset threshold value may be performed by a processor such as an AP. Alternatively, the operation for determining whether at least one of the sensed current value or power value is greater than or equal to the preset threshold value may be performed by an IC independent from the PMIC or the processor. The independent IC may include the power sensor and, in this case, may operate as a sensor hub. Alternatively, the sensor hub may control an external sensor. Accordingly, it is possible to prevent additional power consumption since the processor is not turned on all the time for power management. The independent IC may be implemented by a hub which does not include the power sensor. That is, the independent IC may manage power of the electronic device by using the power value or the current value from the power sensor instead of the AP while including a calculation module, a memory, and a control circuit which do not include the sensor.

In step 530, the electronic device may generate a first signal for controlling at least one of the PMIC, the processor, and a system (for example, hardware) at least partially based on the determination. The electronic device may control at least one of the PMIC, the processor, and the system (for example, hardware) by using the generated first signal. A configuration by which the electronic device controls at least one of the PMIC, the processor, and the system (for example, hardware) based on the first signal will be described below in more detail.

Figure 6:
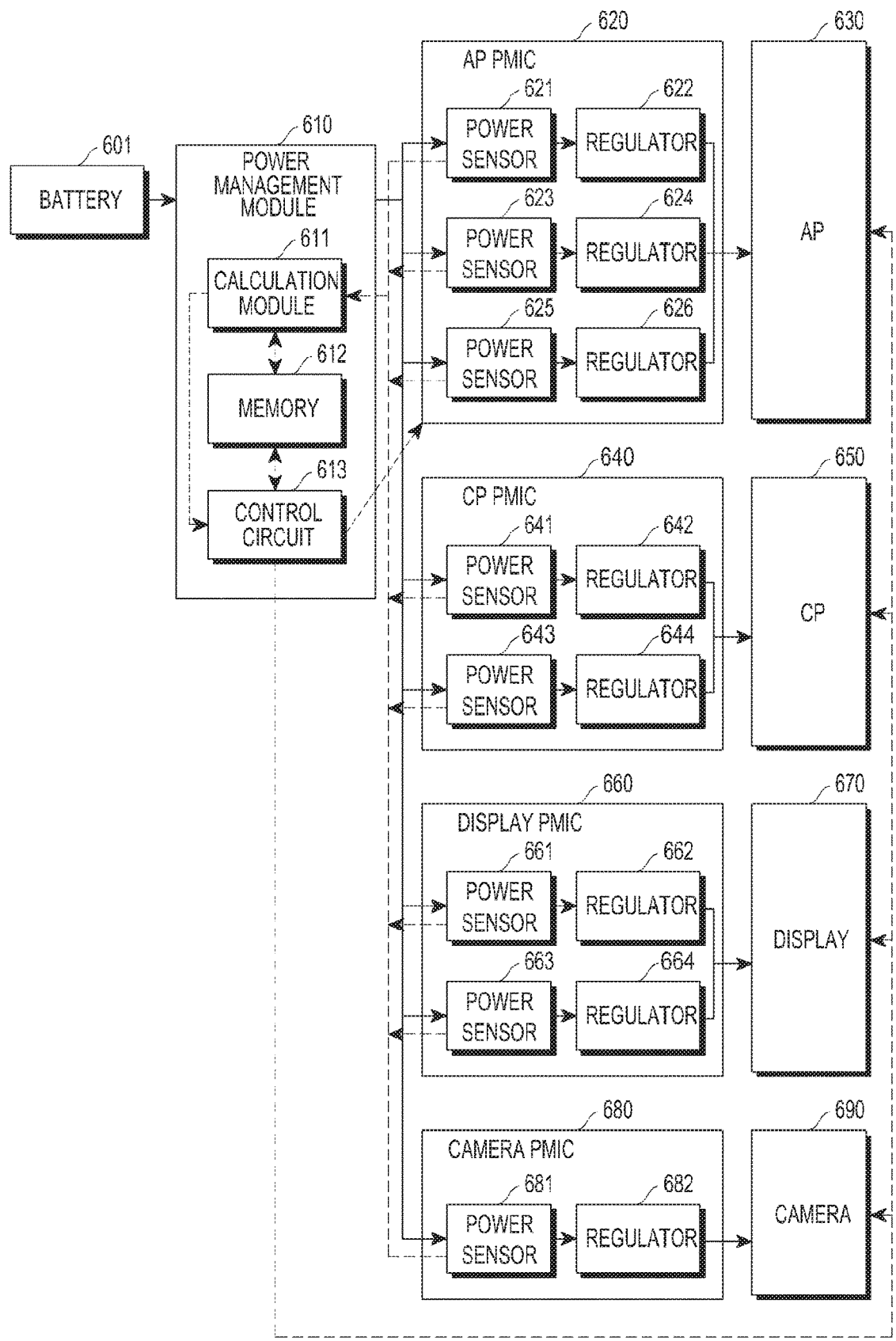
FIG. 6 is a diagram of a configuration of the electronic device, according to an embodiment of the present disclosure.

FIG. 6 is a diagram of a configuration of an electronic device, according to an embodiment of the present disclosure.

As illustrated in FIG. 6, the electronic device includes a battery 601, a power management module 610, an AP PMIC 620, an AP 630, a CP PMIC 640, a CP 650, a display PMIC 660, a display 670, a camera PMIC 680, and a camera 690. Meanwhile, although the electronic device includes the AP 630, the CP 650, the display 670, and the camera 690 as hardware for providing power in FIG. 6, it will be understood by those skilled in the art that FIG. 6 is only an example. Lines for connecting the elements of FIG. 6 may include a power path, I2C, or a control path for transferring a controlled signal or information such as a serial interface.

In the embodiment of FIG. 6, a path through which power moves is displayed by the solid line and a path through which a signal or information is transferred is displayed by the dotted line.

The battery 601 may include, for example, a rechargeable battery and/or a solar battery.

The AP PMIC 620 may manage power input from the battery 601 and output the power to the AP 630. Each of the AP PMIC 620, the CP PMIC 640, the display PMIC 660, and the camera PMIC 680 may manage power output into the connected hardware and may be called a sub PMIC.

The AP PMIC 620 may include one or more sensors 621, 623, and 625 which may sense at least one of a power value and a current value input into the AP PMIC 620. That is, in the present embodiment, the PMIC or the sub PMIC may include at least one sensor which may measure at least one of the current value and the power value input into each thereof. The one or more sensors 621, 623, and 625 may sense at least one of the power value and the current value input into the AP PMIC 620 and output a result of the sensing to the power management module 610. Further, the one or more sensors 621, 623, and 625 may output the power input from the battery 601 to regulators 622, 624, and 626. The regulators 622, 624, and 626 may regulate the input power and output the regulated power to the AP 630. The number of regulators may be singular or plural per PMIC. The number of regulators may be set according to the purpose of the use of the PMIC and it will be understood by those skilled in the art that there is no limitation on the number of regulators. Meanwhile, the power management module 610 may generate a first signal for controlling at least one of the hardware and the application or controlling a power value output into the hardware based on at least one of the current value and the power value received from the one or more sensors 621, 623, and 625. In the following embodiment, a process of generating the first signal by the power management module 610 will be described in more detail.

The calculation module 611 may compare at least one of the current value and the power value received from the one or more sensors 621, 623, and 625 with a threshold stored in the memory 612, for example, at least one of a threshold current value and a threshold power value. A result of the calculation may be stored in the memory 612. In the present embodiment, it is assumed that the calculation module 611 performs the calculation based on the power value. The calculation module 611 may compare the power values received from the one or more sensors 621, 623, and 625 with the threshold power value stored in the memory 612. The threshold power value may be a power value allowed for a normal operation of the AP 630 or the AP 630 configured for a normal operation of the electronic device. For example, when excessive power (for example, greater than or equal to the threshold power value) is applied to the AP 630, the electronic device may abnormally operate or give bad influence to the quality of the AP 630. Accordingly, the threshold power value allowed for the AP 630 may preset. The threshold power value may be set according to each piece of hardware or each application. Further, although the threshold power value is stored in the memory 612 included in the power management module 610 in FIG. 6, it is only an example. The memory 612 may be arranged as hardware independent from the power management module 610 and, in this case, the power management module 610 may receive information on the threshold power value from the external memory 612 and perform a comparative calculation.

For example, the power value input into the AP PMIC 620 may be greater than the threshold power value allowed for the AP 630. The calculation module may output a result of the comparison that the power value input into the AP PMIC 620 is greater than the threshold power value allowed for the AP 630 to the control circuit 613. The control circuit 613 may generate a first signal for controlling at least one of the hardware and the application based on the result of the comparison or controlling the power value output into the AP 630 from the AP PMIC 620. The control circuit 613 may output the generated first signal to the AP PMIC 620. The AP PMIC 620 may receive the power value output into the AP 630 from the AP PMIC 620 in response to the received first signal. For example, the AP PMIC 620 may reduce the output power value by controlling operations of the one or more regulators 622, 624, and 626. Accordingly, overpower applied to the AP 630 may be prevented. Alternatively, the control circuit 613 may output the first signal to the AP 630. The AP 630 may limit a function of the application executed in response to the received first signal and, accordingly, request a power value relatively smaller than before. The power management module 6110 may generate the first signal by using the current value input into the sub PMIC. For example, the power management module 610 may receive current values from the one or more power sensors 621, 623, and 625. Further, the memory 612 may store a threshold current value set to be allowed for the AP 630. The calculation module 611 may compare the current value input into the AP PMIC 620 with the stored threshold current value. The control circuit 613 may generate the first signal for controlling at least one of the one piece of hardware and the application based on a result of the comparison or controlling the power value output into the hardware from the sub PMIC. Further, according to various embodiments of the present disclosure, the power management module 610 may generate the first signal by using both the current value and the power value input into the sub PMIC.

Meanwhile, with respect to each of the CP PMIC 640, the display PMIC 660, and the camera PMIC 680, the power management module 610 may control power in a similar way to the AP PMIC 620. For example, the power management module 610 may receive at least one of the current values and the power values from the power sensors 641, 643, 661, 663, and 681. The power management module 610 may generate the first signal for controlling the power value output from the sub PMIC by controlling, for example, at least one of the regulators 642, 644, 662, 664, and 682.

A process of generating the first signal by using the current values and the power values input into one piece of hardware and the corresponding sub PMIC has been described. Meanwhile, the power management module 610 may generate the first signal by using at least one of the current values and the power values input into all the sub PMICs 620, 640, 660, and 680. For example, the memory 612 may store a power value allowed for all pieces of hardware as a threshold power value. The corresponding threshold power value may be dynamically set in accordance with power currently left in the battery 610. The power management module 610 may calculate a sum of the power values input into the sub PMICs 620, 640, 660, and 680. The calculation module 611 may compare whether a result of the sum is greater than the threshold power value. The control circuit 613 may generate the first signal for controlling at least one of the one piece of hardware and the application based on a result of the comparison or controlling the power value output into the hardware from the sub PMIC. For example, when the sum of the power values input into the sub PMICs 620, 640, 660, and 680 is greater than the threshold power value, the control circuit 613 may generate the first signal for limiting at least some functions of the hardware 630, 650, 670, and 690. In this case, the control circuit 613 may determine hardware of which the function will be limited according to a preset priority and generate the first signal including the determined hardware of which the function will be limited. Meanwhile, the power management module 610 may generate the first signal by using the sum of the current values input into the sub PMIC. For example, the power management module 610 may receive the current values from the one or more sub PMICs 620, 640, 660, and 680 and calculate the sum thereof. Further, the memory 612 may store the current value output from the battery 601 as a threshold current value. The calculation module 611 may compare current values input into the one or more sub PMICs 620, 640, 660, and 680 with the stored threshold current value. The control circuit 613 may generate the first signal for controlling at least one of the hardware and the application based on a result of the comparison or controlling the current value output into the hardware from the sub PMIC. Further, the power management module 610 may generate the first signal by using both the current value and the power value input into the sub PMIC.

As described above, each sub PMIC may include the power sensor.

Figure 7:
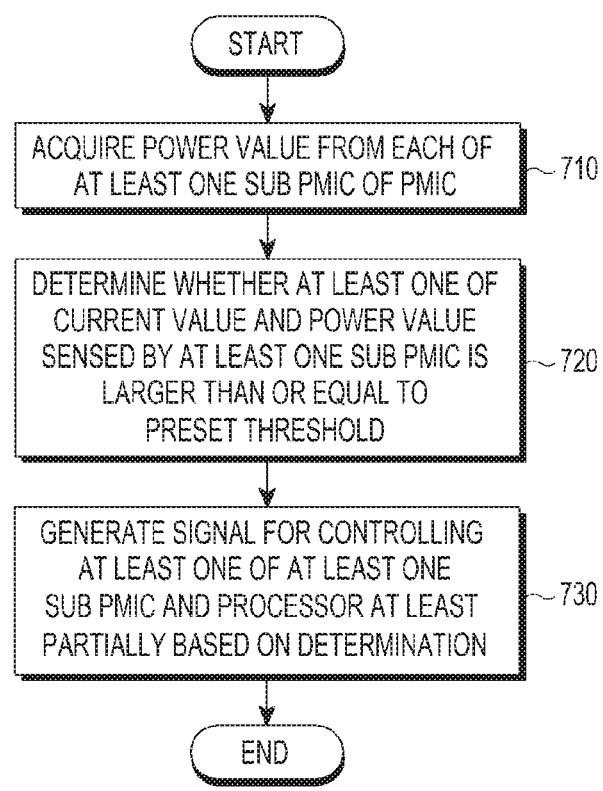
FIG. 7 is flowchart of a method of controlling the electronic device, according to an embodiment of the present disclosure.

FIG. 7 is a flowchart illustrating a method of controlling the electronic device, according to an embodiment of the present disclosure.

In step 710, the electronic device may acquire at least one of a power value and a current value from each of one or more sub PMICs of the PMIC. For example, like in the embodiment of FIG. 6, the sub PMIC may include a power sensor for sensing at least one of the current value and the power value input from the battery. The electronic device may acquire at least one of the power value and the current value input from the PMIC.

In step 720, the electronic device may compare power values sensed by one or more sub PMICs with pre-stored power information, for example, a threshold. The threshold may be a power value allowed for a particular sub PMIC. As described above, when excessive power is applied to a particular piece of hardware, the quality of the corresponding piece of hardware may deteriorate. Accordingly, the electronic device may store a power value allowed for each of the sub PMICs corresponding to hardware, that is, a threshold. The electronic device may compare a sum of the power values sensed by the one or more sub PMICs with the pre-stored power information. The threshold may be a sum of the power values allowed for the sub PMIC.

In step 730, the electronic device may control at least one piece of hardware or application according to a result of the comparison between the acquired power value and the pre-stored power information (for example, the threshold). For example, the electronic device may limit at least one function of at least one piece of hardware when the sensed value is greater than the threshold. In another example, the electronic device may control at least one function of at least one application when the sensed value is greater than the threshold.

Figure 8:
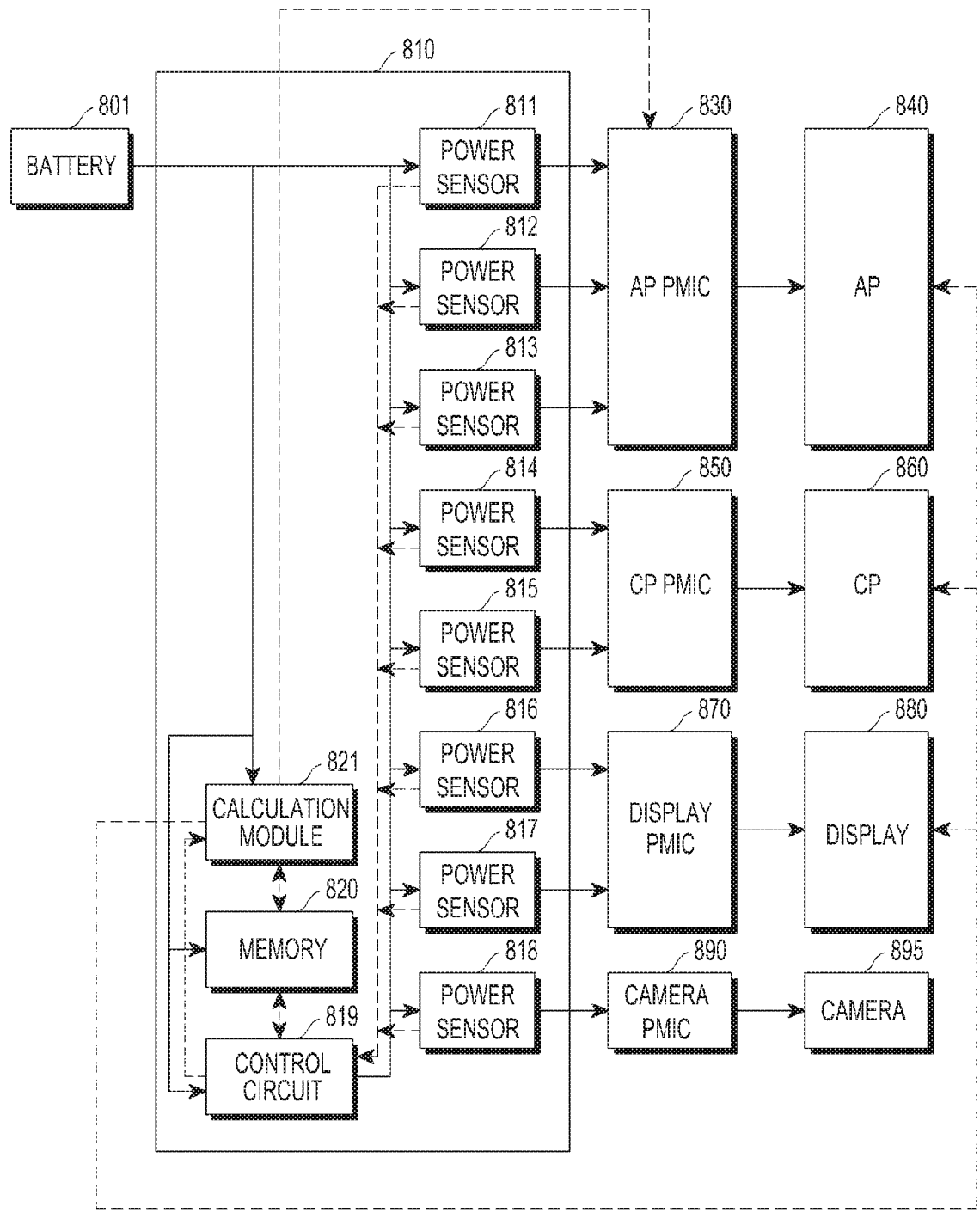
FIG. 8 is a diagram of a configuration of the electronic device, according to an embodiment of the present disclosure.

FIG. 8 is a diagram of a configuration of an electronic device, according to an embodiment of the present disclosure. In the embodiment of FIG. 8, a path through which power moves is displayed by the solid line and a path through which a signal or information is transferred is displayed by the dotted line for convenience of the description.

As illustrated in FIG. 8, the electronic device includes a battery 801, a power management module 810, an AP PMIC 830, an AP 840, a CP PMIC 850, a CP 860, a display PMIC 870, a display 880, a camera PMIC 890, and a camera 895. Meanwhile, although the electronic device includes the AP 840, the CP 860, the display 880, and the camera 895 as hardware for providing power in FIG. 8, it will be understood by those skilled in the art that FIG. 8 is only an example.

The battery 801 may include, for example, a rechargeable battery and/or a solar battery.

The power management module 810 may include one or more power sensors 811 to 818 arranged on a path of connections between the battery 810 and one or more sub PMICs 830, 850, 870, and 890. That is, in contrast to the arrangement of the power sensor within the sub PMIC in FIG. 6, the one or more power sensors 811 to 818 may be included in the power management module 810 independent from the sub PMICs 830, 850, 870, and 890 in the embodiment of FIG. 8.

Each of the one or more power sensors 811 to 818 may sense at least one of the current value and the power value input into each of the sub PMICs 830, 850, 870, and 890 from the battery 801. Each of the one or more power sensors 811 to 818 may sense the current value input into each of the sub PMICs 830, 850, 870, and 890 from the battery 801. Further, each of the one or more power sensors 811 to 818 may sense the voltage value input into each of the sub PMICs 830, 850, 870, and 890 from the battery 801. Each of the one or more power sensors 811 to 818 may calculate the sensed current value or voltage value and determine a power value input into each of the sub PMICs 830, 850, 870, and 890 from the battery 801.

The calculation module 819 may compare the threshold current value or threshold power value stored in the memory 820 with at least some of the current values sensed by the one or more power sensors 811 to 818 or the threshold power values. For example, the memory 820 may store the threshold power value according to each piece of hardware shown in Table 1.

TABLE 1

| Hardware | Threshold power value |
|---|---|
| AP | 3 W |
| CP | 2 W |
| Display | 10 W |
| Camera | 15 W |

The calculation module 819 of the electronic device may compare whether the sum of the power values from the power sensors 811, 812, and 813 is greater than or equal to the threshold power value corresponding to the AP. The control circuit 821 may generate the first signal for controlling at least one of the hardware and the application based on a result of the comparison. For example, it is assumed that the sum of the power values from the power sensors 811, 812, and 813 is 4 W. The calculation module 819 may transfer the result of the comparison that the sensed power value is greater than the threshold power value 3 W to the control circuit 821. The control circuit 821 may transmit the first signal for reducing the power value output into the AP PMIC 830 or the AP 840. The AP PMIC 830 may reduce the power value output into the AP 840 in response to the first signal. Alternatively, the control circuit 821 may transmit the first signal for limiting at least some functions of the AP 840 to the AP 840. The AP 840 may limit at least some functions in response to the first signal. Alternatively, the control circuit 821 may transmit the first signal for limiting at least some of the executed applications to the AP 840. The AP 840 may end some of the executed applications in response to the first signal. Meanwhile, the power may be managed based on at least one of the power value and the current value as well as the power value. Meanwhile, the configuration for controlling the power value output into the AP 840 is only an example and, with respect to various pieces of hardware such as the CP 860, the display 880, and the camera 895 as well as the AP 840, the electronic device may control the power value output in the same way as described above.

In the aforementioned embodiment, a process of generating the first signal by using the current values or the power values input into one piece of hardware and the corresponding sub PMIC has been described. Meanwhile, the power management module 810 may generate the first signal by using at least one of the current values and the power values input into all the sub PMICs 830, 850, 870, and 890. For example, the memory 820 may store a threshold power value corresponding to the power value output from the battery 801. The power management module 810 may calculate a sum of the power values input into the sub PMICs 830, 850, 870, and 890. The calculation module 819 may compare whether a result of the sum is greater than the threshold power value. The control circuit 821 may generate the first signal according to a result of the comparison. For example, when the sum of the power values input into the sub PMICs 830, 850, 870, and 890 is greater than the threshold power value, the control circuit 821 may generate the first signal for limiting at least some functions of the hardware 840, 860, 880, and 895. In this case, the control circuit 821 may determine hardware of which the function will be limited according to a preset priority and generate the first signal including information on the determined hardware of which the function will be limited. Meanwhile, the power management module 810 may generate the first signal by using the sum of the current values input into the sub PMIC. For example, the power management module 810 may receive the current values from the one or more sub PMICs 830, 850, 870, and 890 and calculate the sum. Further, the memory 820 may store the current value output from the battery 801 as the threshold power value. The calculation module 819 may compare current values input into the one or more sub PMICs 830, 850, 870, and 890 with the stored threshold current value. The control circuit 821 may generate the first signal for controlling at least one of the one piece of hardware and the application based on a result of the comparison or controlling the power value output into the hardware from the sub PMIC. Further, the power management module 810 may generate the first signal by using both the current value and the power value input into the sub PMIC.

As described above, the power management module 810 that operates as a sensor hub independent from the PMIC and the hardware may sense the power value and the current value input into the PMIC and control at least one of another hardware and application by using the sensed power value and current value. Accordingly, it is possible to prevent additional power consumption since the processor such as the AP is not turned on all the time for power management. Alternatively, the sensor hub may control an external sensor without having a sensor.

Figure 9:
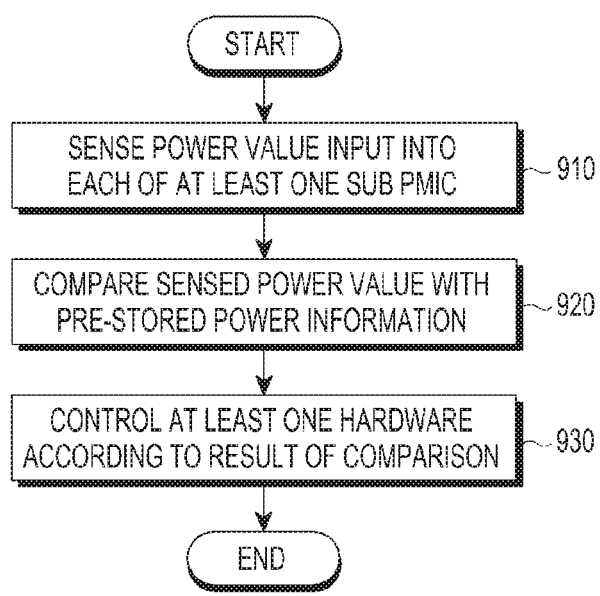
FIG. 9 is a flowchart of a method of a sensor hub, according to an embodiment of the present disclosure.

FIG. 9 is a flowchart of method of the sensor hub, according to an embodiment of the present disclosure. For example, FIG. 9 may be a flowchart of a method of a sensor hub such as the power management module 810 independent form the PMIC and the processor of FIG. 8.

In step 910, the sensor hub may sense the power value input into each of at least one sub PMIC. The sensor hub may include a power sensor that may sense a power value of an input terminal of each sub PMIC. That is, the sensor hub may be arranged on a path of the power from the battery to the sub PMIC.

In step 920, the sensor hub may compare the sensed power value with pre-stored power information. The sensor hub may include a memory for pre-storing power information, for example, information on a threshold power value. The sensor hub may include a calculation means (or device) which may perform a comparative calculation. The calculation means may compare the pre-stored power information, for example, the information on the threshold power value with the sensed power value. The memory may store various pieces of power information such as a threshold power value allowed for each piece of hardware and a threshold power value allowed for all hardware, which will be described below in more detail.

In step 930, the sensor hub may control at least one of at least one piece of hardware and the application according to a result of the comparison. For example, the sensor hub may output a signal for directly controlling the hardware. In another example, the sensor hub may output a signal for limiting or ending a function of the executed application through the processor (for example, the AP 840 or the CP 860).

As described above, the sensor hub may perform power management while operating independently from the processor of the electronic device.

Figure 10:
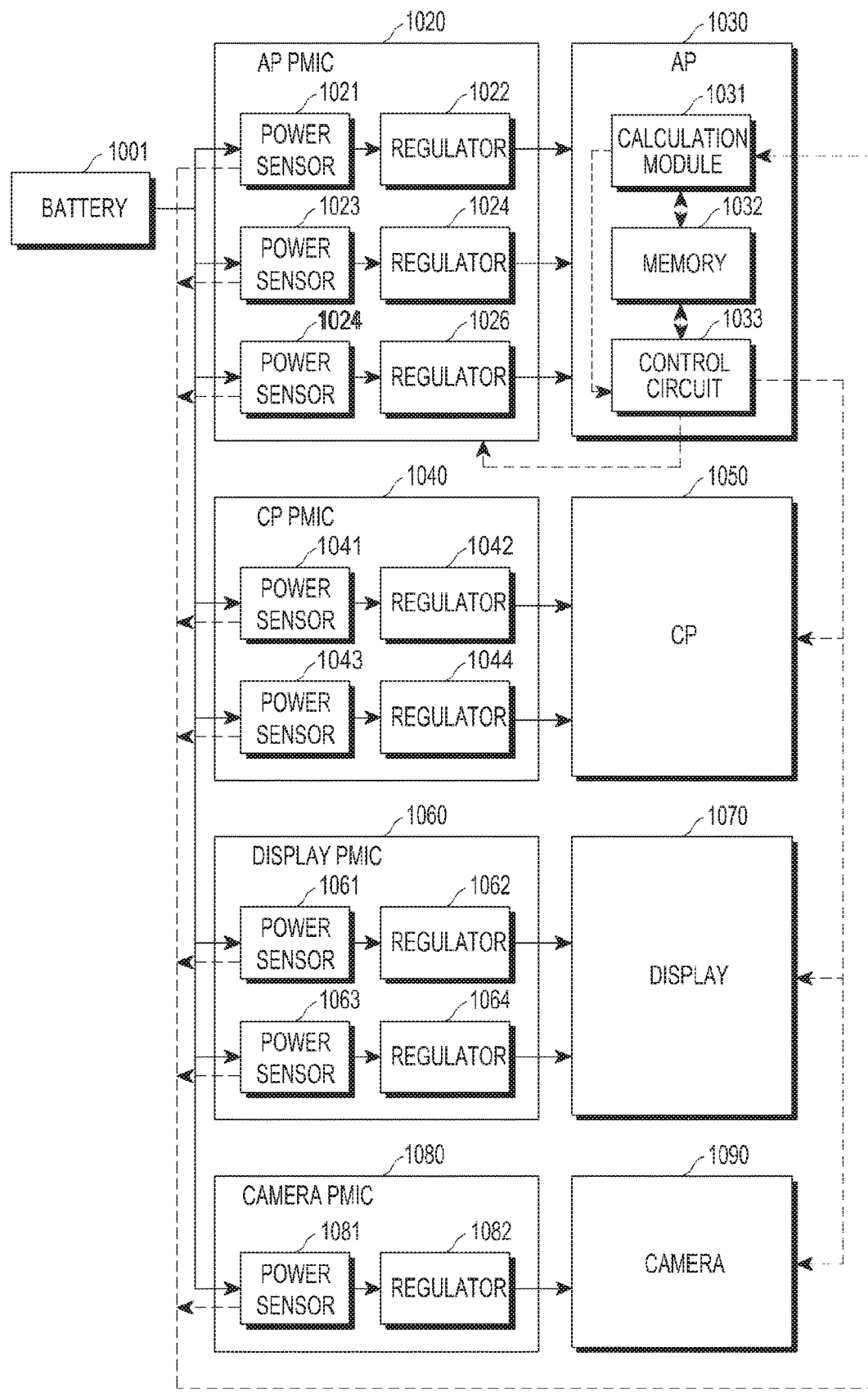
FIG. 10 is a diagram of a configuration of the electronic device, according to an embodiment of the present disclosure.

FIG. 10 is a diagram of a configuration of an electronic device, according to an embodiment of the present disclosure. In the embodiment of FIG. 10, a path through which power moves is displayed by the solid line and a path through which a signal or information is transferred is displayed by the dotted line.

As illustrated in FIG. 10, the electronic device includes a battery 1001, an AP PMIC 1020, an AP 1030, a CP PMIC 1040, a CP 1050, a display PMIC 1060, a display 1070, a camera PMIC 1080, and a camera 1090. Meanwhile, although the electronic device includes the AP 1030, the CP 1050, the display 1070, and the camera 1090 as hardware for providing power in FIG. 10, it will understood by those skilled in the art that FIG. 10 is only an example.

The battery 1001 may include, for example, a rechargeable battery and/or a solar battery.

The AP PMIC 1020 may manage power input from the battery 1001 and output the power to the AP 1030. Each of the AP PMIC 1020, the CP PMIC 1040, the display PMIC 1060, and the camera PMIC 1080 may manage power output into the connected hardware and may be called a sub PMIC.

The AP PMIC 1020 may include one or more sensors 1021, 1023, and 1024 that may sense at least one of the power value and the current value input into the AP PMIC 1020. That is, the PMIC or the sub PMIC may include at least one of the current value and the power value input into each thereof. The one or more sensors 1021, 1023, and 1025 may sense the power value and the current value input into the AP PMIC 120 and output a result of the sensing to the AP 1030. Further, power from the battery 1001 may be transferred to regulators 1022, 1024, and 1026 after passing through the one or more sensors 1021, 1023, and 1025. The regulators 1022, 1024, and 1026 may regulate the input power and output the regulated power to the AP 1030. Meanwhile, the AP 1030 may generate a first signal for controlling at least one of the one piece of hardware and the application based on at least one of current values or power values received from the one or more sensors 1021, 1023, and 1025 or controlling the power value output into the hardware. In the following embodiment, a process in which the AP 1030 generates the first signal will be described in more detail.

The calculation module 1031 may compare at least one of the current values or the power values received from the one or more power sensors 1021, 1023, and 1025 with a threshold stored in the memory 1032, for example, at least one of a threshold current value or a threshold power value. In the present embodiment, it is assumed that the calculation module 1031 performs the calculation based on the power value. The calculation module 1031 may compare the power values received from the one or more sensors 1021, 1023, and 1025 with the stored threshold power value. The threshold power value may be a power value allowed for a normal operation of the AP 1030 or the AP 1030 configured for a normal operation of the electronic device. For example, when excessive power is applied to the AP 1030, the electronic device may abnormally operate or adversely influence the quality of the AP 1030. Accordingly, the threshold power value allowed for the AP 1030 may preset. The threshold power value may be set according to each piece of hardware or each application, or be set by a combination between at least one operating hardware or at least one executed application.

For example, the power value input into the AP PMIC 1020 may be greater than the threshold power value allowed for the AP 1030 stored in the memory 1032. The calculation module 1031 may transmit a result of the comparison that the power value input into the AP PMIC 1020 is greater than the threshold power value allowed for the AP 1030 to the control circuit 1033. The control circuit 1033 may generate a first signal for controlling at least one of the hardware and the application based on the result of the comparison or controlling the power value output into the AP 1030 from the AP PMIC 1020. The control circuit 1033 may transmit the generated first signal to the AP PMIC 1020. The AP PMIC 1020 may reduce the power value output into the AP 1030 from the AP PMIC 1020 in response to the received first signal. For example, the AP PMIC 1020 may reduce the output power value by controlling operations of the one or more regulators 1022, 1024, and 1026. Accordingly, overpower applied to the AP 1030 may be prevented. Alternatively, the AP 1030 may limit at least some functions of the executed application based on a result of the comparison and, accordingly, request a power value which is relatively smaller than before. Meanwhile, the AP 1030 may generate the first signal by using the current value input into the sub PMIC. For example, the AP 1030 may receive current values from the one or more power sensors 1021, 1023, and 1025. Further, the memory 1032 may store a threshold current value set to be allowed for the AP 1030. The calculation module 1031 may compare the current value input into the AP PMIC 1020 with the threshold current value stored in the memory 1032. The control circuit 1033 may generate the first signal for controlling at least one of the hardware and the application based on a result of the comparison or controlling the power value output into the hardware from the sub PMIC. Further, the AP 1030 may generate the first signal by using both the current value and the power value input into the sub PMIC.

Meanwhile, with respect to each of the CP PMIC 1040, the display PMIC 1060, and the camera PMIC 1080, the AP 1030 may control power in a similar way to that of the embodiment of the AP PMIC 1020. For example, the AP 1030 may receive at least one of the current value and the power value from the power sensors 1041, 1043, 1061, 1063, and 1081. The AP 1030 may generate the first signal for controlling the power value output from the sub PMIC by controlling, for example, at least one of the regulators 1042, 1044, 1062, 1064, and 1082.

In the aforementioned embodiment, a process of generating the first signal by using the current values and the power values input into one piece of hardware and the corresponding sub PMIC has been described. Meanwhile, the AP 1030 may generate the first signal by using at least one of the current values or the power values input into all the sub PMICs 1020, 1040, 1060, and 1080. For example, the memory 1032 may store a power value allowed for all hardware as a threshold power value. The corresponding threshold power value may be dynamically set in accordance with power currently left in the battery 1001. The AP 1030 may calculate a sum of the power values input into the sub PMICs 1020, 1040, 1060, and 1080. The calculation module 1031 may compare whether a result of the sum is greater than the threshold power value. The control circuit 1033 may generate the first signal according to a result of the comparison. For example, when the sum of the power values input into the sub PMICs 1020, 1040, 1060, and 1080 is greater than the threshold power value, the control circuit 1033 may generate the first signal for limiting at least some functions of the hardware 1030, 1050, 1070, and 1090. In this case, the control circuit 1033 may determine hardware of which the function will be limited according to a preset priority and generate the first signal including the determined hardware of which the function will be limited. Meanwhile, the AP 1030 may generate the first signal by using the sum of the current values input into the sub PMICs. For example, the AP 1030 may receive the current values from the one or more sub PMICs 1020, 1040, 1060, and 1080 and calculate the sum. Further, the memory 1032 may store the current value output from the battery 1001 as the threshold power value. The calculation module 1031 may compare current values input into the one or more sub PMICs 1020, 1040, 1060, and 1080 with the stored threshold current value. The control circuit 1033 may generate the first signal for controlling at least one of the one piece of hardware and the application based on a result of the comparison or controlling the power value output into the hardware from the sub PMIC. Further, the AP 1030 may generate the first signal by using both the current value and the power value input into the sub PMIC. The electronic device may receive the sum from the power sensors of each sub PMIC and control power by using the received sum from the power sensors of each sub PMIC. The electronic device may receive power values from the power sensors of the sub PMIC and collect the power values according to each sub PMIC or receive power values collected from the sub PMICs.

Meanwhile, the memory 1032 may exist outside the AP 1030.

Figure 11:
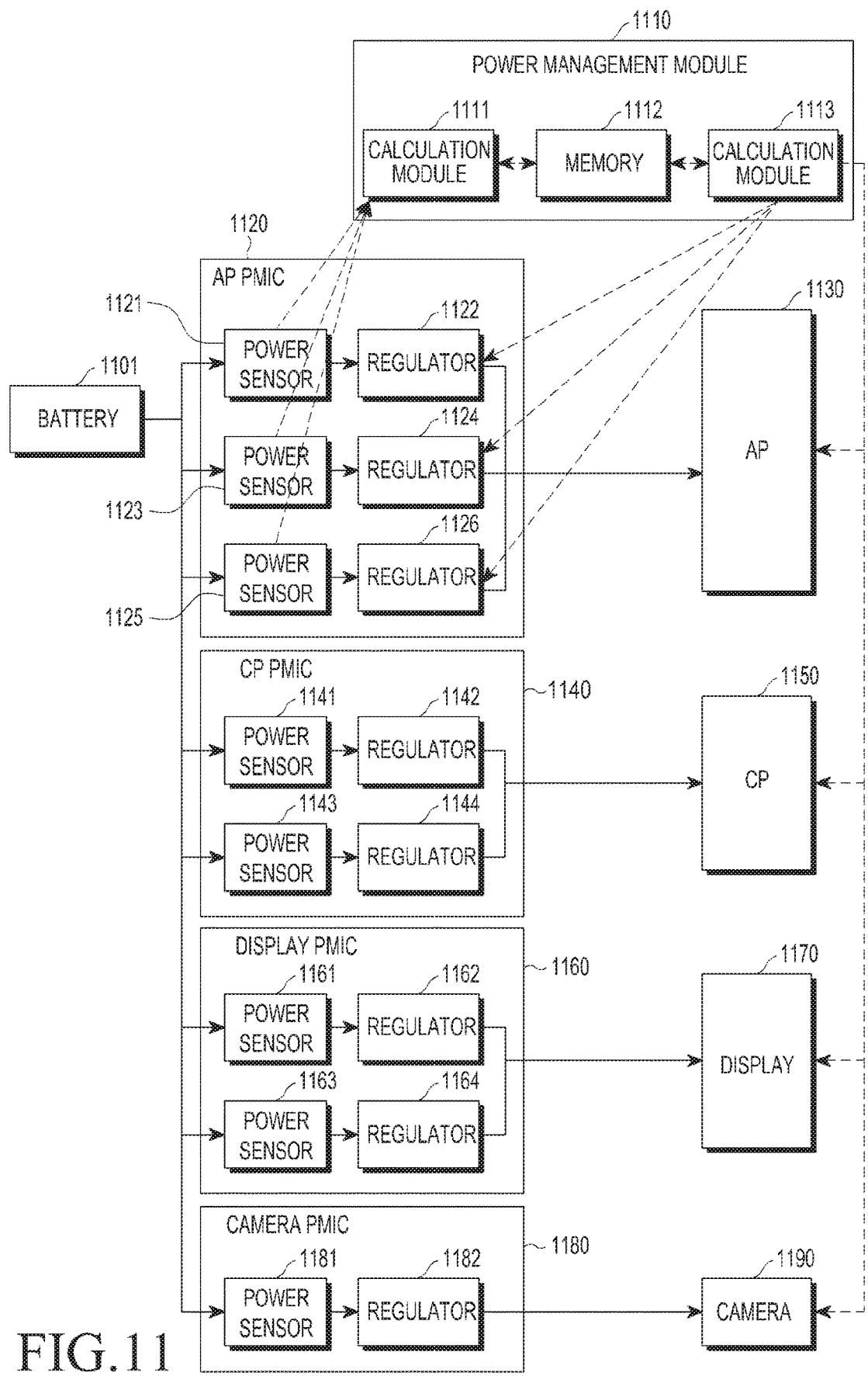
FIG. 11 is a diagram of a configuration of the electronic device, according to an embodiment of the present disclosure.

FIG. 11 is a diagram of a configuration of an electronic device, according to an embodiment of the present disclosure. In the embodiment of FIG. 11, a path through which power moves is displayed by the solid line and a path through which a signal or information is transferred is displayed by the dotted line.

As illustrated in FIG. 11, the electronic device includes a battery 1101, a power management module 1110, an AP PMIC 1120, an AP 1130, a CP PMIC 1140, a CP 1150, a display PMIC 1160, a display 1170, a camera PMIC 1180, and a camera 1190. Meanwhile, although the electronic device includes the AP 1130, the CP 1150, the display 1170, and the camera 1190 as hardware for providing power in FIG. 11, it will be understood by those skilled in the art that FIG. 11 is only an example. Meanwhile, each element of FIG. 11 may operate similarly to each element of FIG. 6 having the same name, so that a detailed description of some elements will be omitted.

In the embodiment of FIG. 11, in contrast to FIG. 6, the power control module 1110 may be connected to the sub PMICs (for example, 1120, 1140, 1160, and 1180) in parallel. More specifically, the power control block 1110 may acquire at least one of the current value and the power value input into the AP PMIC 1120 from each power sensor 1121, 1123, or 1125 of the AP PMIC 1120. A calculation module 1111 of the power control block 1110 may compare a pre-stored threshold value, for example, at least one of a threshold current value and a threshold power value with at least one a sensed current value and power value. The memory 1112 may pre-store information on the threshold. The control circuit 1113 may generate a first signal for controlling at least one of the hardware and the application based on a result of the comparison. In this case, the control circuit 1113 may output the first signal to regulators 1122, 1124, and 1126. The regulators may control output voltages by using the received first signal. Alternatively, the control circuit 1113 may output the first signal to the AP 1130. The AP 1130 may control a clock of the processor by using the received first signal.

Meanwhile, the power control block 1110 may not pre-store threshold value information. In this case, the power control block 1110 may store a maximum value on a predetermined cycle while periodically monitoring at least one of the current values or the power values sensed by the power sensors 1121, 1123, and 1125. When at least one of the current value and the power value, which is greater than the stored maximum value is sensed, the power control block 1110 may generate the first signal.

In the aforementioned embodiment, the electronic device generates the first signal based on at least one of the current value and the power value input into the AP PMIC 1120 but it is only an example, and the electronic device may generate the first signal based on at least one of the current values or the power values input into other sub PMICs 1140, 1160, and 1180.

Figure 12:
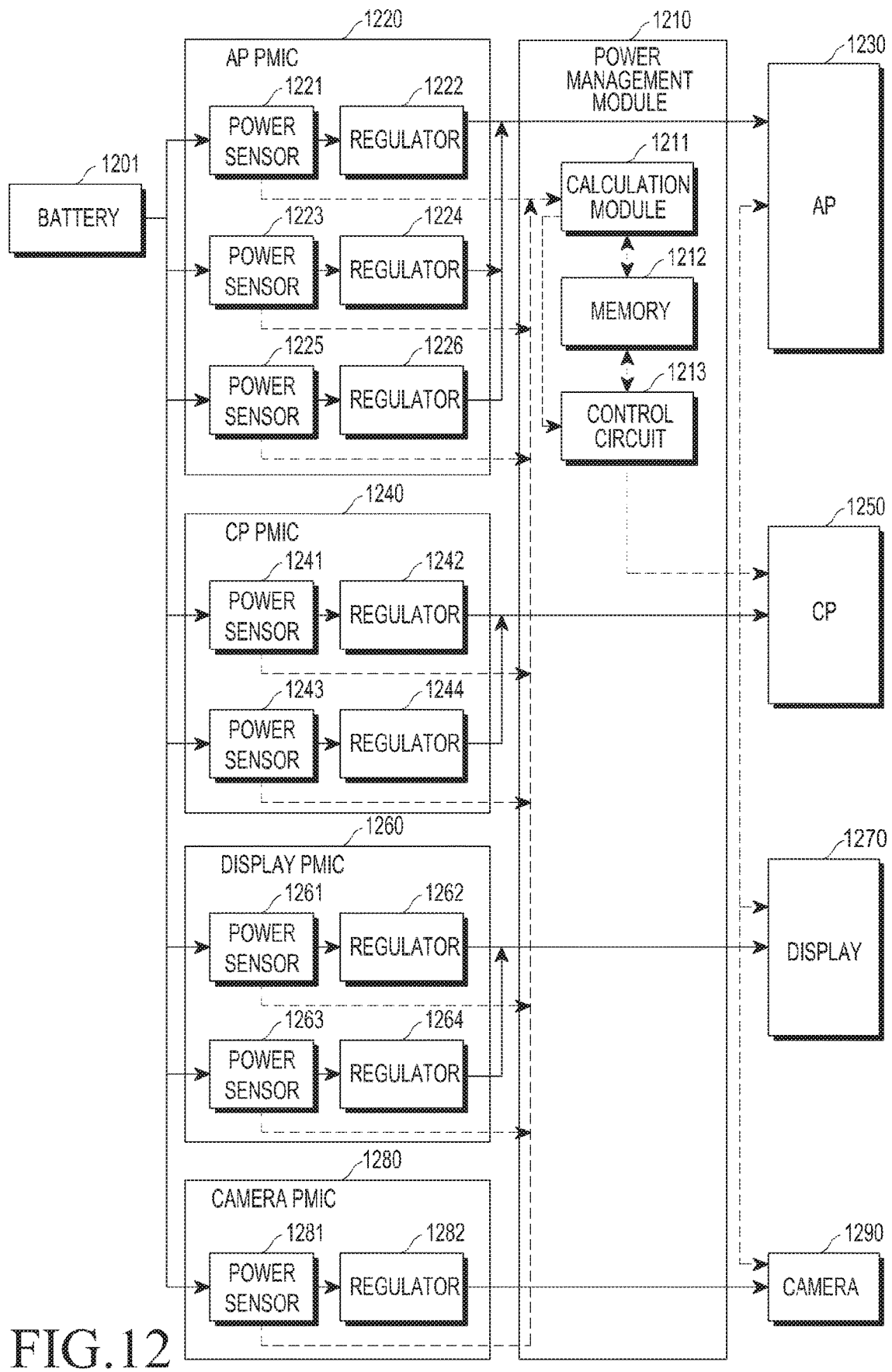
FIG. 12 is a diagram of a configuration of the electronic device, according to an embodiment of the present disclosure.

FIG. 12 is a diagram of a configuration of an electronic device, according to an embodiment of the present disclosure. In the embodiment of FIG. 12, a path through which power moves is displayed by the solid line and a path through which a signal or information is transferred is displayed by the dotted line.

As illustrated in FIG. 12, the electronic device includes a battery 1201, a power management module 1210, an AP PMIC 1220, an AP 1230, a CP PMIC 1240, a CP 1250, a display PMIC 1260, a display 1270, a camera PMIC 1280, and a camera 1290. Meanwhile, although the electronic device includes the AP 1230, the CP 1250, the display 1270, and the camera 1290 as hardware for providing power in FIG. 12, it will be understood by those skilled in the art that FIG. 12 is only an example. Meanwhile, each element of FIG. 12 may operate similarly to each element of FIG. 6 having the same name, so that a detailed description of some elements will be omitted.

In the embodiment of FIG. 12, in contrast to FIG. 6, the power management module 1210 may be arranged between the sub PMIC 1220, 1240, 1260, and 1280, and each piece of hardware 1230, 1250, 1270, and 1290. More specifically, the power management module 1210 may acquire at least one of the current value and the power value input into the AP PMIC 1220 from each power sensor 1221, 1223, or 1225 of the AP PMIC 1220. A calculation module 1211 of the power management module 1210 may compare a pre-stored threshold, for example, at least one of a threshold current value and a threshold power value with at least one of a sensed current value and power value. The memory 1212 may pre-store information on the threshold. The control circuit 1213 may generate a first signal for controlling at least one of the hardware and the application based on a result of the comparison. For example, the control circuit 1213 may output the first signal to a regulator 1226. The regulator 1226 may control an output voltage by using the received first signal. The control circuit 1213 may output the first signal to a plurality of regulators 1222, 1224, 1226, 1242, 1244, 1262, 1264, and 1282. In another example, the control circuit 1213 may output the first signal to the AP 1230. The AP 1230 may control a clock of the processor by using the received first signal. The power management module 1210 may be located between the sub PMIC 1220, 1240, 1260, and 1280, and each piece of hardware 1230, 1250, 1270, and 1290, but there is no limitation on a location of the power management module 1210. Further, the power management module 1210 may control other sub PMICs 1240, 1260, and 1280 or various hardware 1250, 1270, and 1290 as well as the regulator 1226.

Figure 13C:
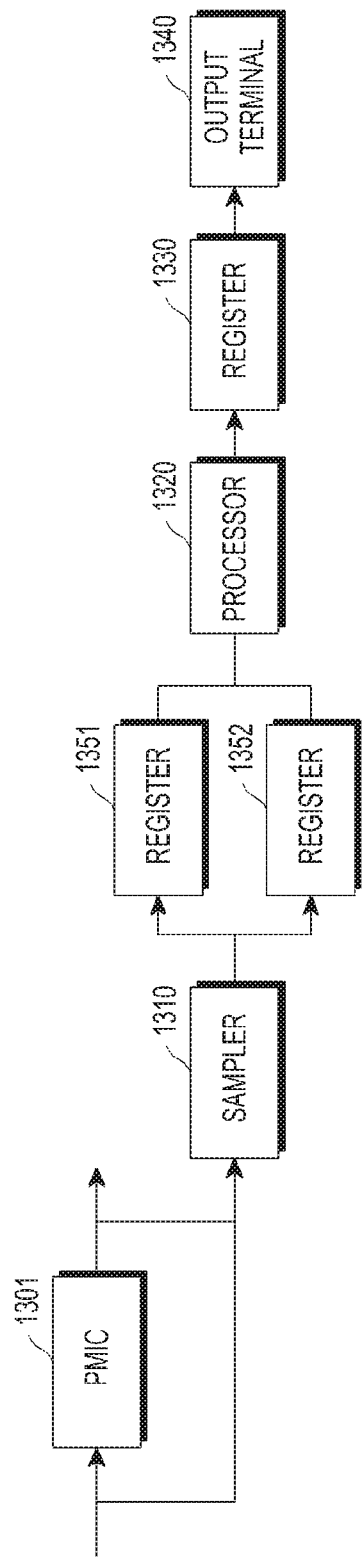

FIGS. 13A to 13C are diagrams of a configuration of a power sensor, according to an embodiment of the present disclosure.

Referring to FIG. 13A, the power sensor may include, for example, a sampler 1310 connected to an input terminal of a PMIC 1301. The sampler 1310 may be connected to the input terminal of the PMIC 1301 and sample a signal from the input terminal on a preset sampling cycle. When the sampled signal is output, a processor 1320 may process the sampled signal in real time, so that real time power management is possible.

A processor 1320 may perform a calculation on the sampled signal. For example, the processor 1320 may sense a voltage value or a current value from the sampled signal and perform a product calculation on the sensed voltage value or current value. Accordingly, the processor 1320 may determine a power value of the sampled signal.

The processor 1320 may temporarily store a result of the calculation in a register 1330. The result of the calculation, that is, the power value temporarily stored in the register 1330 may be output to an output terminal 1340 and transferred to, for example, a power management module that generates a first signal or an AP. Meanwhile, instead of the result of the calculation such as the power value, values required for calculating the power value such as a current value or a voltage value may be stored in the register 1330. In this case, the current value or the voltage value may be transferred to the power management module or the AP, and calculate the power value by using the current value or the voltage value received by the power management module or the AP.

Meanwhile, in FIG. 13B, in contrast to FIG. 13A, the sampler 1310 may be connected to the output terminal of the PMIC 1301. Accordingly, the processor 1320 may perform a calculation on the sampled signal from the output terminal of the PMIC 1301.

For example, the processor 1320 may sense a voltage value and a current value from the sampled signal and perform a product calculation on the sensed voltage value and current value. Accordingly, the processor 1320 may determine a power value of the sampled signal from the output terminal of the PMIC 1301.

The power sensor of FIG. 13C may further include registers 1351 and 1352 that are connected to the sampler 1310. The power sensor may temporarily store the voltage value of the sampled signal in the register 1351 and temporarily store the current value of the sampled signal in the register 1352. The processor 1320 may perform the product calculation on the current value and the voltage value stored in the two registers 1351 and 1352, respectively, and store a power value which is a result of the calculation in the register 1330.

Figure 14:
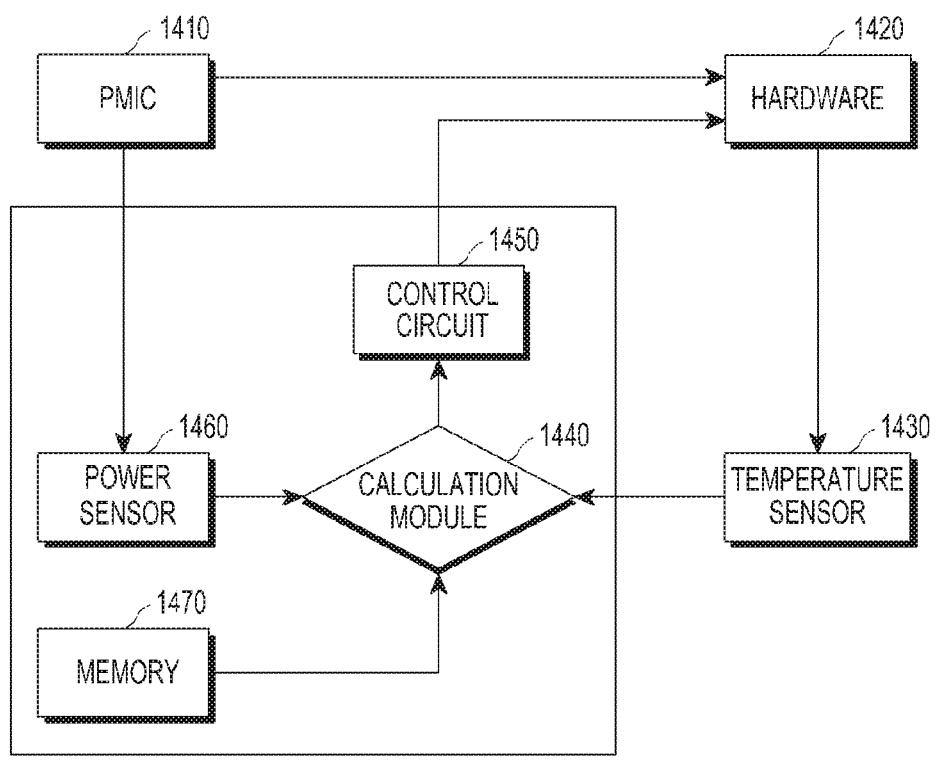
FIG. 14 is a diagram of the electronic device, according to an embodiment of the present disclosure.

FIG. 14 is a diagram of an electronic device, according to an embodiment of the present disclosure.

Referring to FIG. 14, a PMIC 1410 of the electronic device may manage power transferred to hardware 1420 from a battery. A power sensor 1460 may sense at least one of a current value and a power value of an input terminal of the PMIC. The power sensor 1460 has no limitation on a location thereof if the power sensor 1460 can sense at least one of the current value and the power value of the input terminal of the PMIC 1410. A memory 1470 may store at least one of a threshold current value and a threshold power value allowed for each piece of hardware. A calculation module 1440 may compare at least one of the threshold current value and the threshold power value with at least one of the sensed current value and power value, and a control circuit 1450 may generate a first signal for controlling the hardware 1420 based on a result of the comparison.

Meanwhile, a temperature sensor 1430 may measure a temperature associated with the hardware 1420. The calculation module 1440 may receive temperature information from the temperature sensor 1430. The calculation module 1440 may generate a first signal by further using the temperature information. More specifically, the memory 1470 may store a threshold temperature allowed for each piece of hardware 1420. The calculation module 1440 may compare the threshold temperature and a measured temperature, and the control circuit 1450 may generate the first signal for controlling the hardware 1420 according to a result of the comparison. For example, the memory 1470 may store the threshold temperature of 80 degrees that is allowed for the AP. Further, the temperature sensor 1430 may sense the temperature of the AP corresponding to 90 degrees and output the temperature to the calculation module 1440. The calculation module 1440 may determine that the sensed temperature of the AP exceeds the threshold temperature and the control circuit 1450 may output the first signal for limiting at least some functions of the AP to the AP based on a result of the determination.

The temperature sensor 1430 may sense a temperature of at least one sub PMIC and output a result of the sensing to the calculation module 1440. The calculation module 1440 may determine whether the sensed temperature of at least one sub PMIC exceeds the threshold temperature and output the first signal for limiting at least some functions of the hardware related to the sub PMIC of which the temperature exceeds the threshold temperature based on a result of the comparison.

Figure 15:
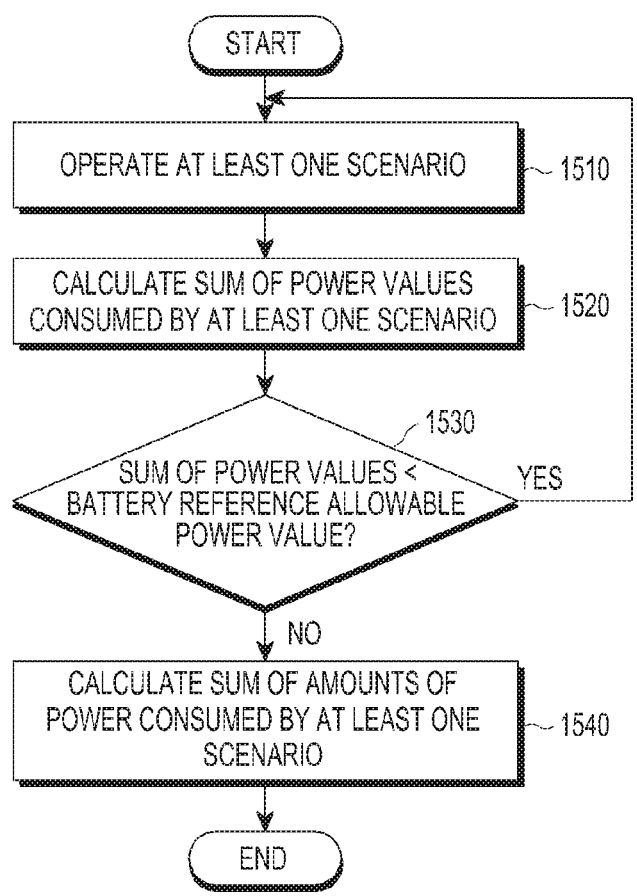
FIG. 15 is a flowchart of a method of controlling the electronic device, according to an embodiment of the present disclosure.

FIG. 15 is flowchart of a method of controlling the electronic device, according to an embodiment of the present disclosure.

In step 1510, the electronic device may receive at least one scenario operation request. For example, the electronic device may receive a second application execution request while executing a first application.

In step 1520, the electronic device may calculate a sum of power values consumed by at least one scenario. For example, the electronic device may determine that first hardware operates by the first application and second hardware operates by the second application, and may determine that a third power value, which is a sum of a first power value corresponding to power consumption of the first hardware and a second value corresponding to power consumption of the second hardware, will be consumed based on the operating scenario.

In step 1530, the electronic device may determine whether the sum of the power values (for example, the third power value) is smaller than a battery reference allowable power value. The battery reference allowable power value may be set based on a residual power value of the battery. When the sum of the power values is greater than or equal to the battery reference allowable power value, the electronic device may limit some of at least one scenario in operation 1540. For example, the electronic device may stop execution of the first application and execute the second application or may not execute the second application while maintaining the execution of the first application. In another example, the electronic device may limit some of one or more functions of the first application or the second application. A reference for controlling the application may be determined based on a priority of the application, a currently activated application, or power consumption.

Figure 16:
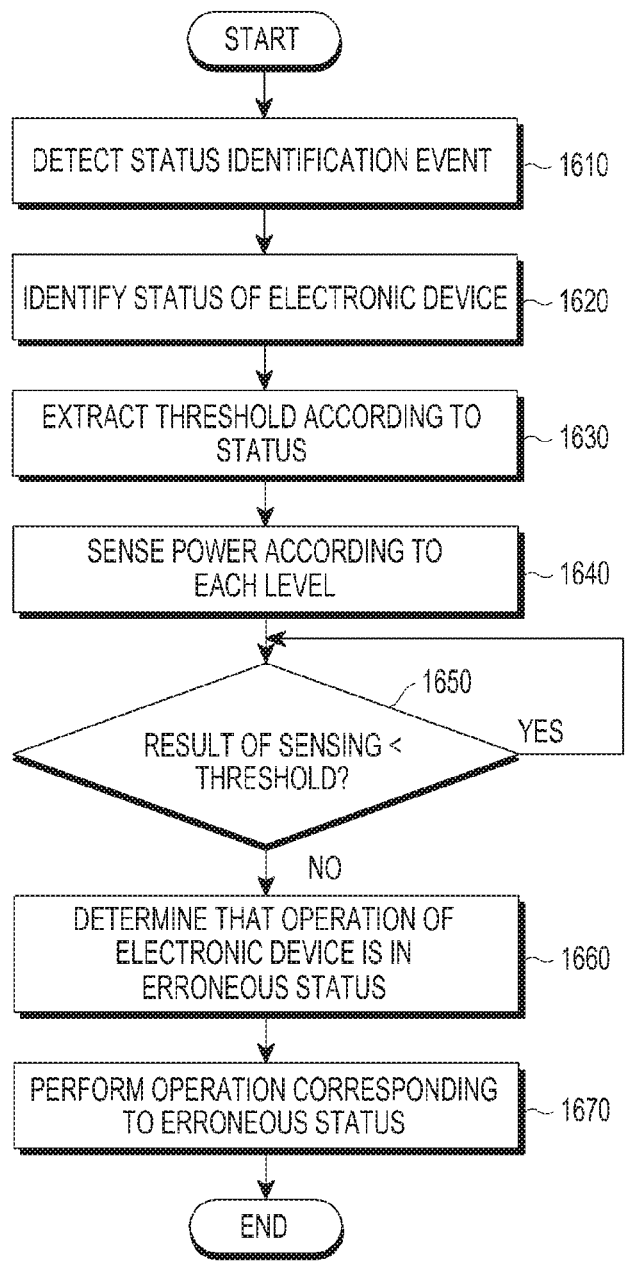
FIG. 16 is a flowchart of a method of controlling the electronic device, according to an embodiment of the present disclosure.

FIG. 16 is a flowchart of a method of controlling the electronic device, according to an embodiment of the present disclosure.

The electronic device may store one or more databases having different set thresholds (for example, current values or power values) based on a status (for example, power saving mode, airplane mode, or sleep mode) of the electronic device in the memory 130.

In step 1610, the electronic device may detect a status identification event for identifying the status of the electronic device. The electronic device may detect a change in mode (sleep, airplane, or power saving) by the user or system or a change in residual battery as the status identification event. Alternatively, the electronic device may identify the status of the electronic device on a predetermined cycle and detect arrival of the predetermined cycle as the status identification event.

In step 1620, the electronic device may identify the status of the electronic device. The electronic device may identify the status of the electronic device in response to the detection of the status identification event.

In step 1630, the electronic device may extract a threshold according to the status of the electronic device. The electronic device may select a database according to the status of the electronic device from the memory 130. For example, the electronic device may identify that the electronic device is in a power saving mode in which a residual amount of the battery is relatively low and select a database corresponding to the power saving mode. The electronic device may extract a threshold of the database.

In step 1640, the electronic device may sense power on each path of the power connected to each piece of hardware from the sub PMIC or each path of the power connected to each sub PMIC from the battery.

In step 1650, the electronic device may determine whether a result of the sensing is equal to or smaller than the threshold of the database. When the result of the sensing is greater than or equal to the threshold of the database, the electronic device may determine that the operation of the electronic device is in an erroneous status in step 1660.

When the result of the sensing is less than or equal to the threshold of the database, the electronic device may maintain the current status. The electronic device may again monitor the detection of the status identification event when the result of the sensing is equal to or smaller than the threshold of the database.

In step 1670, the electronic device may perform an operation corresponding to the erroneous status. For example, the electronic device may limit at least one function of at least one piece of hardware and the executed application.

Figure 17:
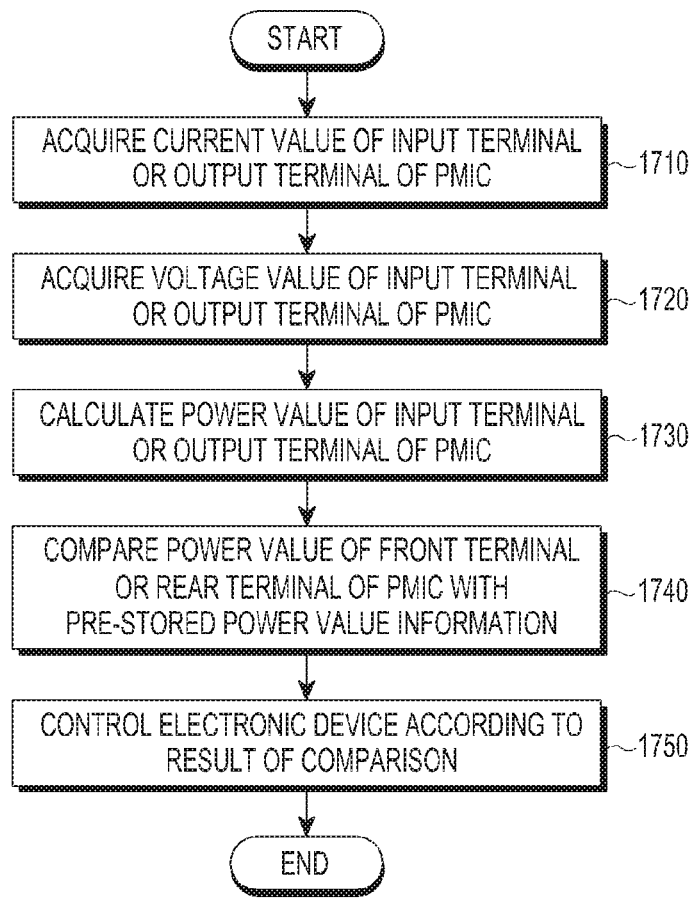
FIG. 17 is a flowchart of a method of controlling the electronic device, according to an embodiment of the present disclosure.

FIG. 17 is a flowchart of a method of controlling the electronic device, according to an embodiment of the present disclosure. FIG. 17 illustrates a method of controlling the electronic device that acquires a power value based on a current value and a voltage value of an input terminal or an output terminal of the PMIC.

In step 1710, the electronic device may acquire the current value of the input terminal or the output terminal of the PMIC. For example, the electronic device may sample a signal from the input terminal or the output terminal of the PMIC and acquire the current value of the input terminal or the output terminal of the PMIC based on the sampled signal. The electronic device may acquire current values of input terminals or output terminals of all PMICs. Alternatively, the electronic device may acquire the current value of the input terminal or the output terminal according to each sub PMIC corresponding to each piece of hardware.

In step 1720, the electronic device may acquire the voltage value of the input terminal or the output terminal of the PMIC. For example, the electronic device may sample a signal from the input terminal or the output terminal of the PMIC and acquire the voltage value of the input terminal or the output terminal of the PMIC based on the sampled signal. The electronic device may acquire voltage values of input terminals or output terminals of all PMICs. Alternatively, the electronic device may acquire the voltage value of the input terminal or the output terminal according to each sub PMIC corresponding to each piece of hardware.

In step 1730, the electronic device may calculate a power value of the input terminal or the output terminal of the PMIC. The electronic device may calculate the power value based on the calculation of the acquired current value and voltage value.

In step 1740, the electronic device may compare the power value of the input terminal or the output terminal of the PMIC with pre-stored power value information, for example, a threshold power value. In step 1750, the electronic device may control the electronic device according to a result of the comparison. For example, when a power value of currently used hardware is greater than a threshold power value set based on a residual power value of the battery, the electronic device may limit some functions of the hardware.

Figure 18:
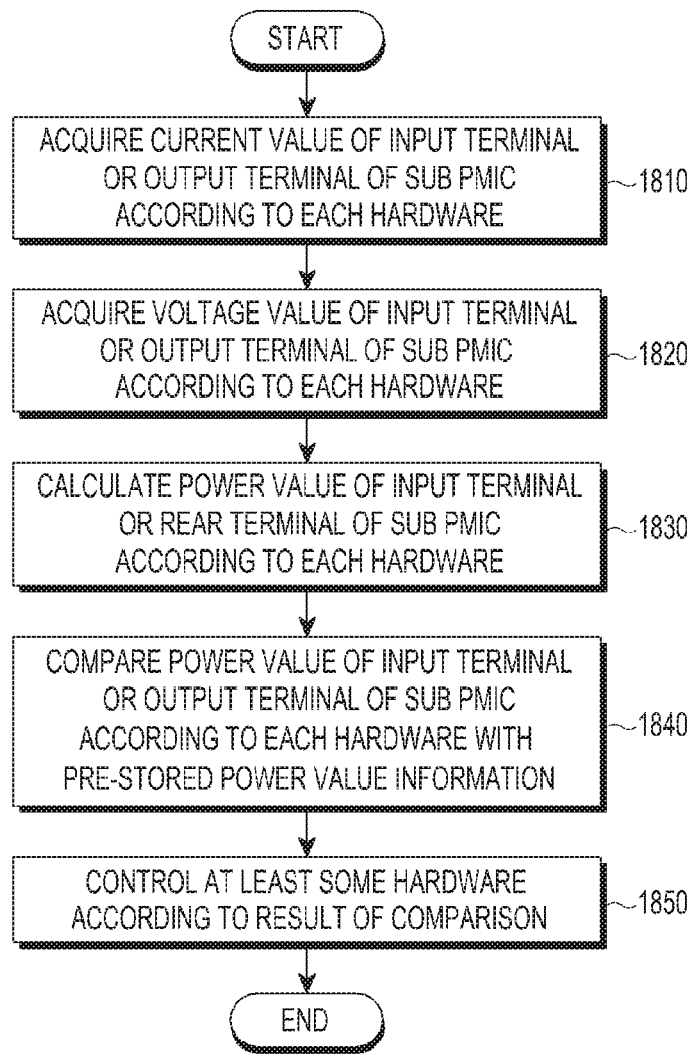
FIG. 18 is a flowchart of a method of controlling the electronic device, according to an embodiment of the present disclosure.

FIG. 18 is a flowchart of a method of controlling the electronic device, according to an embodiment of the present disclosure. FIG. 18 illustrates the method of controlling the electronic device which acquires a power value based on a current value and a voltage value of an input terminal or an output terminal of the sub PMIC.

In step 1810, the electronic device may acquire the current value of the input terminal or the output terminal of the sub PMIC according to each piece of hardware. In step 820, the electronic device may acquire the voltage value of the input terminal or the output terminal of the sub PMIC according to each piece of hardware. In step 1830, the electronic device may calculate the power value of the input terminal or the output terminal of the sub PMIC according to each piece of hardware. The electronic device may acquire the current value of the sub PMIC according to each piece of hardware or the current value according to each power sensor.

In step 1840, the electronic device may compare the power value of the input terminal or the output terminal of the sub PMIC according to each piece of hardware with pre-stored power value information, for example, an allowable threshold power value. In step 1850, the electronic device may control at least some pieces of hardware based on a result of the comparison. For example, when input or output power of the sub PMIC corresponding to a first piece of hardware exceeds the threshold power value, the electronic device may reduce the power value input or output into the corresponding sub PMIC.

Figure 19:
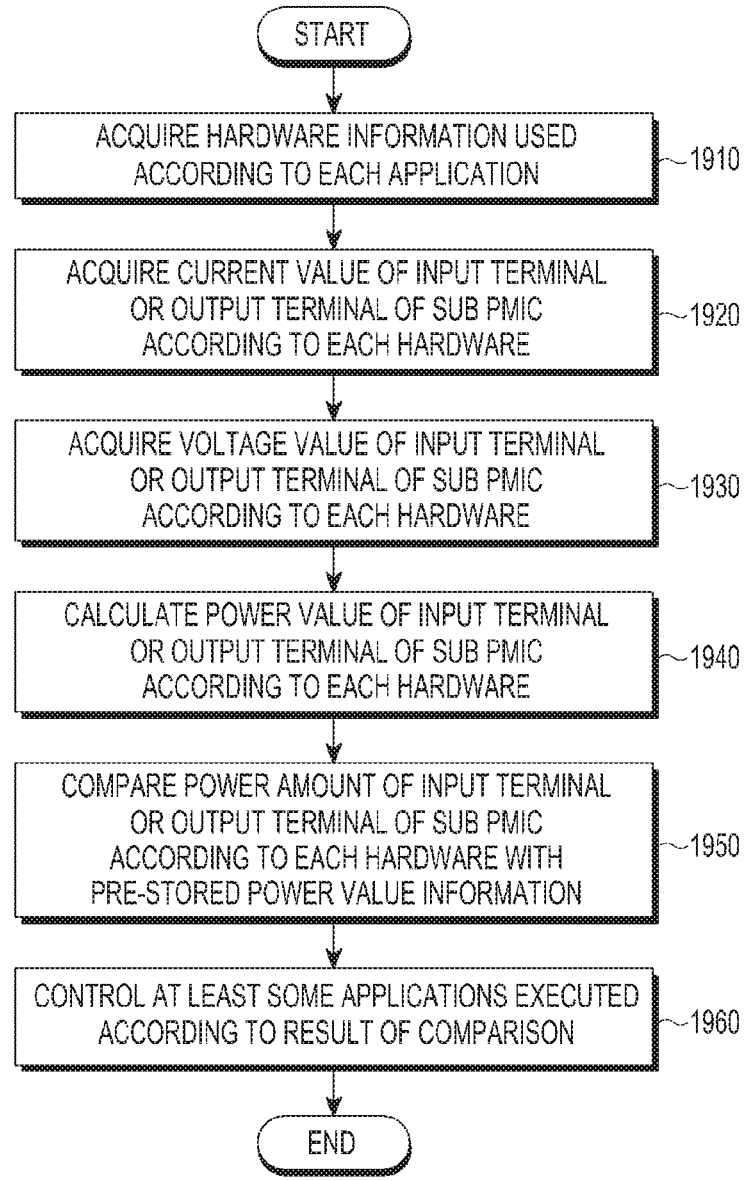
FIG. 19 is a flowchart of a method of controlling the electronic device, according to an embodiment of the present disclosure.

FIG. 19 is a flowchart of a method of controlling the electronic device, according to an embodiment of the present disclosure. FIG. 19 illustrates the method of controlling the electronic device that controls at least some functions of the application based on hardware information used according to each application.

In step 1910, the electronic device may acquire hardware information used according to each application. Further, the electronic device may acquire information on a power value consumed according to each piece of hardware. The electronic device may acquire information on the hardware operating in accordance with the currently executed application and the consumed power value information.

In step 1920, the electronic device may acquire the current value of the input terminal or the output terminal of the sub PMIC according to each piece of hardware. In step 1930, the electronic device may acquire the voltage value of the input terminal or the output terminal of the sub PMIC according to each piece of hardware. In step 1940, the electronic device may calculate the power value of the input terminal or the output terminal of the sub PMIC according to each piece of hardware.

In step 1950, the electronic device may compare a power value of the input terminal or the output terminal of the sub PMIC according to each piece of hardware with pre-stored power value information. In step 1960, the electronic device may control at least some of the executed applications according to a result of the comparison. For example, when the power value of currently used hardware is greater than the threshold power value set based on a residual power value of the battery, the electronic device may limit at least some functions of the executed application.

Figure 20:
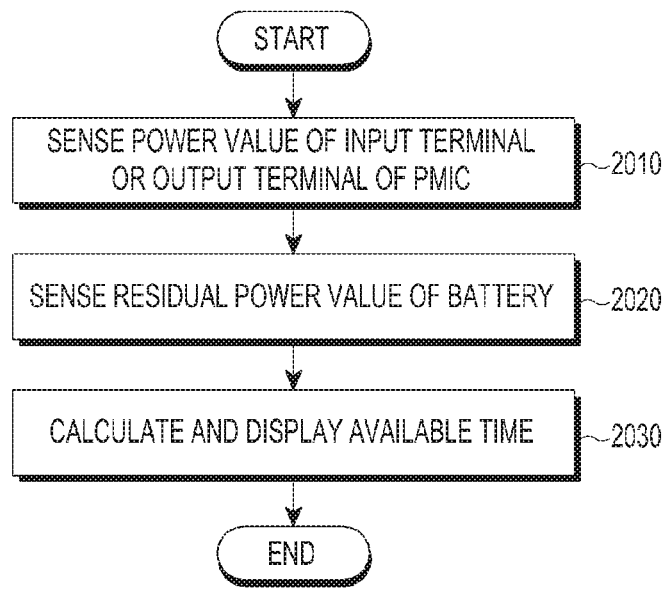
FIG. 20 is a flowchart of a method of controlling the electronic device, according to an embodiment of the present disclosure.

FIG. 20 is a flowchart of a method of controlling the electronic device, according to an embodiment of the present disclosure. FIG. 20 illustrates the method of controlling the electronic device that calculates and displays an available time based on a residual power value of the battery.

In step 2010, the electronic device may sense the power value of the input terminal or the output terminal of the PMIC. In step 2020, the electronic device may sense the residual power value of the battery. In step 2030, the electronic device may calculate and display the available time of the battery based on the residual power value of the battery and the power value of the input terminal or the output terminal of the PMIC.

Figure 21:
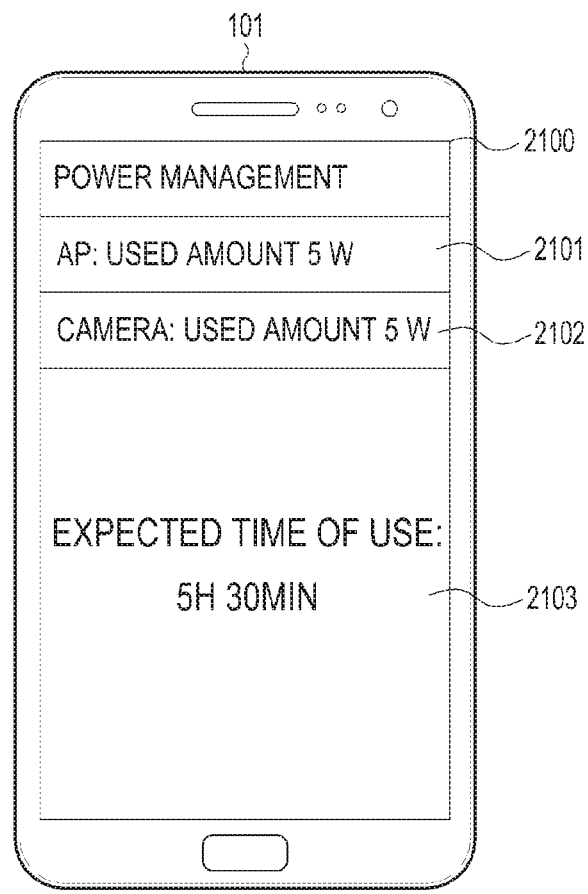
FIG. 21 is a diagram of the electronic device, according to an embodiment of the present disclosure.

FIG. 21 is a diagram of the electronic device, according to an embodiment of the present disclosure.

As illustrated in FIG. 21, the electronic device may display power value information 2101 and 2102 used according to each piece of hardware of the electronic device and available time 2103 of the battery. The electronic device may provide a graphic user interface which may control at least some of the hardware and limit at least some functions of the hardware and the application based on a received user input.

The electronic device may allow execution of a particular application even in a state where a residual amount of the battery is relatively low. For example, when there is a request for executing the application, the electronic device may grasp power used by the application in real time, compare the power used by the application with the residual amount of the battery, and determine whether to execute the application. For example, when the battery lacks power, the electronic device may allow 3V and 4V and grasp provision of power of 12 W to the PMIC. In this case, with respect to a request for executing an application that uses power of 15 W, the electronic device may limit the execution of the corresponding application. Alternatively, with respect to a request for executing an application that uses power of 10 W, the electronic device may allow the execution of the corresponding application. Further, the residual amount of the battery is further reduced, the electronic device may grasp provision of power of 8 W to the PMIC and, in this case, limit the execution of the application that uses power of 10 W. That is, when the residual amount of the battery lacks, the electronic device may dynamically control operations of the application and the hardware based on power information grasped in real time without directly executing a particular application.

A method of operating an electronic device may include an operation of acquiring, from a power sensor, at least one of a current value and a power value input into a PMIC by the electronic device comprising the PMIC and the power sensor, an operation of determining whether at least one of the acquired current value and power value is greater than or equal to a threshold value by the electronic device, and an operation of generating a first signal for controlling at least one piece of hardware of the electronic device at least partially based on the determination by the electronic device.

The first signal may include at least one piece of information for controlling at least some functions of the at least one piece of hardware, information for controlling at least some functions of an application program executed by the at least one piece of hardware, and information for controlling an amount of power supplied to the PMIC.

The method of operating the electronic device may further include an operation of measuring a temperature of the at least one piece of hardware, and the operation of the generating the first signal may include an operation of generating the first signal based on the measured temperature.

A method of controlling an electronic device including a PMIC may include an operation of sensing a power value of at least one of an input terminal and an output terminal of the PMIC and an operation of generating a first signal for controlling at least one of at least one hardware component the electronic device and an application program executed by the electronic device based on a power value provided from a power sensor.

The operation of sensing the power value may include an operation of sensing at least one of a voltage value and a current value of at least one of the input terminal and the output terminal of the PMIC and an operation of determining a power value of at least one of the input terminal and the output terminal of the PMIC based on at least one of the sensed voltage value and current value.

The operation of sensing the power value may include an operation of sampling a signal received from at least one of the input terminal and the output terminal of the PMIC and an operation of determining the power value of at least one of the input terminal and the output terminal of the PMIC by performing a calculation on the received signal.

The operation of generating the first signal may include an operation of comparing the power value of at least one of the input terminal and the output terminal of the PMIC input from the power sensor with a threshold power value and generating the first signal according to a result of the comparison, and the threshold power value may be set as a reference for controlling at least one of the at least one piece of hardware and the application program executed by the electronic device.

The first signal may include an instruction for controlling operations of at least some of the hardware components at least partially based on a power value consumed by used hardware component among the at least one hardware component.

The first signal may include an instruction for controlling execution of a used application program at least partially based on a power value consumed by the used application program.

The operation of generating the first signal may include an operation of, when at least some of power values of the input terminal and the output terminal of each of the at least one piece of hardware exceed a threshold power value, generating the first signal for limiting at least some operations of hardware corresponding to the power value that exceeds the threshold power value.

The method of controlling the electronic device may further include an operation of measuring a temperature of at least some of the at least one piece of hardware, and the operation of generating the first signal may include an operation of generating the first signal based on the measured temperature.

Each of the components of the electronic device may be implemented by one or more components and the name of the corresponding component may vary depending on a type of the electronic device. The electronic device may include at least one of the above-described elements. Some of the above-described elements may be omitted from the electronic device, or the electronic device may further include additional elements. Further, some of the components of the electronic device may be combined to form a single entity, and thus, may equivalently execute functions of the corresponding elements prior to the combination.

The programming module may include one or more of the aforementioned components or may further include other additional components, or some of the aforementioned components may be omitted. Operations executed by a module, a programming module, or other component elements may be executed sequentially, in parallel, repeatedly, or in a heuristic manner. Further, some operations may be executed according to another order or may be omitted, or other operations may be added.

A non-transitory storage medium having instructions stored therein is provided and is configured to instruct one or more processor to perform one or more operations when being executed by the one or more processors. The one or more operations may include an operation of acquiring, from a power sensor, at least one of a current value and a power value input into a PMIC by the electronic device comprising the PMIC and the power sensor, an operation of determining whether at least one of the acquired current value and power value is greater than or equal to a threshold value by the electronic device, and an operation of generating a first signal for controlling at least one piece of hardware of the electronic device at least partially based on the determination by the electronic device.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device comprising:
   a battery;
   a plurality of power management integrated circuits (PMICs) electrically connected to the battery and a plurality of hardware components included in the electronic device, wherein each the plurality of PMICs includes at least one power sensor;
   a processor; and
   a control circuit electrically connected to the at least one power sensor included in each of the plurality of PMICs, wherein the control circuit is configured to:
      obtain, from the at least one power sensor, at least one of a current value or a power value input into each of the plurality of PMICs,
      identify whether at least one of a sum of current values input into the plurality of PMICs or a sum of power values input into the plurality of PMICs is greater than or equal to a threshold set based on a residual amount of the battery,
      based on identifying that the at least one of the sum of current values or the sum of the power values is greater than or equal to the threshold, identify at least one function of the plurality of hardware components to be limited, and
      based on identifying the at least one function of the plurality of hardware components to be limited, control at least one of the plurality of PMICs to reduce at least part of power received from the battery and output the reduced power to the plurality of hardware components.

2. The electronic device of claim 1, wherein each of the plurality of PMICs includes one or more regulators configured to reduce the at least part of the power received from the battery.

3. The electronic device of claim 2, wherein the at least one power sensor is electrically connected between one of the one or more regulators and the battery.

4. The electronic device of claim 1, wherein each of the plurality of PMICs comprises:
   a first circuit including a first power sensor connected to the battery and a first regulator connected to the first power sensor in series; and
   a second circuit including a second power sensor connected to the battery and a second regulator connected to the second power sensor in series,
   wherein the first circuit and the second circuit are connected between the battery and the processor in parallel.

5. The electronic device of claim 1, wherein the control circuit is electrically connected between the battery and the at least one power sensor.

6. The electronic device of claim 1, wherein the control circuit and the processor are arranged within a single chip.

7. The electronic device of claim 1, wherein at least a part of the control circuit is arranged on a chip including the plurality of PMICs.

8. The electronic device of claim 1, wherein the control circuit is further configured to control at least some functions of the processor, control at least some functions of an application program executed by the processor, or control an amount of power supplied to the processor from a PMIC connected to the processor.

9. The electronic device of claim 1, further comprising a temperature sensor configured to measure a temperature of the processor, wherein the control circuit is configured to control the at least one of the plurality of PMICs at least partially based on the measured temperature.

10. A method of operating an electronic device, the method comprising:
   obtaining, from at least one power sensor included in each of a plurality of power management integrated circuits (PMICs) of the electronic device, at least one of a current value or a power value input into each of the PMICs, wherein the plurality of PMICs are electrically connected to a battery of the electronic device and a plurality of hardware components included in the electronic device;
   identifying whether at least one of a sum of current values input into the plurality of PMICs or a sum of power values input into the plurality of PMICs is greater than or equal to a threshold value set based on a residual amount of a battery of the electronic device by the electronic device;
   based on identifying that at least one of the sum of current values or the sum of power values is greater than or equal to the threshold, identifying at least one function of the plurality of hardware components to be limited; and
   based on identifying the at least one function of the plurality of hardware components to be limited, controlling the at least one of the plurality of PMICs to reduce at least part of power received from the battery and output the reduced power to the plurality of hardware components.

* * * * *